US008322839B2

(12) United States Patent
Ohshima et al.

(10) Patent No.: US 8,322,839 B2
(45) Date of Patent: Dec. 4, 2012

(54) INKJET RECORDING METHOD, INKJET RECORDING MEDIUM, AND AQUEOUS INK

(75) Inventors: Tohru Ohshima, Atsugi (JP); Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 305 days.

(21) Appl. No.: 12/670,941

(22) PCT Filed: Mar. 17, 2009

(86) PCT No.: PCT/JP2009/055730
§ 371 (c)(1), (2), (4) Date: Jan. 27, 2010

(87) PCT Pub. No.: WO2009/116678
PCT Pub. Date: Sep. 24, 2009

(65) Prior Publication Data
US 2010/0209611 A1    Aug. 19, 2010

(30) Foreign Application Priority Data

Mar. 18, 2008  (JP) ................................. 2008-070309

(51) Int. Cl.
*G01D 11/00* (2006.01)
(52) U.S. Cl. ........................ 347/100; 347/105; 347/101
(58) Field of Classification Search .................. 347/100, 347/102, 101, 105, 95, 96; 106/31.6, 31.27, 106/31.13; 523/160, 161; 428/195, 32.1
See application file for complete search history.

(56) References Cited

U.S. PATENT DOCUMENTS

| | | | |
|---|---|---|---|
| 5,997,136 A * | 12/1999 | Fujisawa et al. | 347/101 |
| 6,436,515 B1 * | 8/2002 | Ohbayashi et al. | 428/32.33 |
| 2001/0012556 A1 * | 8/2001 | Kondo et al. | 428/195 |
| 2001/0036552 A1 * | 11/2001 | Otani et al. | 428/411.1 |
| 2002/0025413 A1 | 2/2002 | Ohbayashi et al. | |
| 2003/0227531 A1 * | 12/2003 | Hosoi et al. | 347/105 |
| 2005/0107254 A1 * | 5/2005 | Ogino et al. | 503/200 |

(Continued)

FOREIGN PATENT DOCUMENTS

JP    2000 64194    2/2000

(Continued)

OTHER PUBLICATIONS

U.S. Appl. No. 12/301,933, filed Nov. 21, 2008, Ohshima, et al.

(Continued)

*Primary Examiner* — Manish S Shah
(74) *Attorney, Agent, or Firm* — Oblon, Spivak, McClelland, Maier & Neustadt, L.L.P.

(57) ABSTRACT

An inkjet recording method including printing an image on a recording medium using an aqueous ink, wherein the recording medium includes a support containing a cellulose pulp, and a coat layer containing a pigment and a binder, and optionally containing a cationic additive in an amount of 0.1% or less in the total amount of the coat layer, which is formed in one or more layers on at least one surface of the support, wherein the recording medium has an outermost layer of the coat layer having a gloss at an angle of 60 degrees in accordance with JIS-ZS-8741 of 13 or less, and a centerline average roughness Ra of 0.2μm to 2.5 μm at a cut-off value of 0.8 and the aqueous ink contains coloring particles, a resin emulsion, water, and a wetting agent, the aqueous ink has a solid content of 3% by mass or more.

8 Claims, 11 Drawing Sheets

U.S. PATENT DOCUMENTS

| | | | |
|---|---|---|---|
| 2006/0168811 A1* | 8/2006 | Ozawa et al. | 29/890.1 |
| 2007/0128349 A1* | 6/2007 | Miyachi | 427/152 |
| 2007/0197685 A1 | 8/2007 | Aruga et al. | |
| 2009/0114121 A1 | 5/2009 | Morohoshi et al. | |
| 2009/0130313 A1 | 5/2009 | Ohshima et al. | |
| 2009/0186162 A1 | 7/2009 | Namba et al. | |
| 2009/0263632 A1 | 10/2009 | Kojima et al. | |
| 2009/0291213 A1 | 11/2009 | Ohshima et al. | |

FOREIGN PATENT DOCUMENTS

| | | |
|---|---|---|
| JP | 2001 277702 | 10/2001 |
| JP | 2001 347748 | 12/2001 |
| JP | 2004 62202 | 2/2004 |
| JP | 2004 115635 | 4/2004 |
| JP | 2004 255596 | 9/2004 |
| JP | 2005 97347 | 4/2005 |
| JP | 3669314 | 4/2005 |
| JP | 3799995 | 5/2006 |
| JP | 2007 144975 | 6/2007 |
| JP | 2009 56615 | 3/2009 |
| WO | WO 03/040242 A2 | 5/2003 |
| WO | WO 2007/049806 A1 | 5/2007 |

OTHER PUBLICATIONS

Extended Search Report issued May 24, 2011 in European Patent Application No. 09723138.5-1251.

U.S. Appl. No. 12/095,614, filed May 30, 2008, Ohshima, et al.

* cited by examiner

FIG. 12

TOTAL AMOUNT REGULATION ALGORITHM (DURING FOUR-COLOR (CMYK) OUTPUT)

```
C_drop = D2Ttable(C):M_drop = D2Ttable(M):/*digital value→drop amount*/
Y_drop = D2Ttable(Y):K_drop = D2Ttable(K):
```
Use drop amount table

```
Total_drop = C_drop + M_drop + Y_drop + K_drop;

if (total_drop ≥ MAX_drop) {
   if (total_drop > k_drop) {
   C_drop = C_drop × (MAX_drop − K_drop) / (total_drop − K_drop);
   M_drop = M_drop × (MAX_drop − K_drop) / (total_drop − K_drop);
   Y_drop = Y_drop × (MAX_drop − K_drop) / (total_drop − K_drop);
             /* no change in K_drop */

C = T2Dtable(C_drop); /*drop amount → digital value */
     M = T2Dtable(M_drop);
     Y = T2Dtable(Y_drop);

} else {
   /* if k > total amount, C=M=Y=0, and K reduce */
     K_drop = total_drop C = 0; M = 0; Y = 0;
       K = T2Dtable (K_drop);
   }
} else {
       /* no regulation processing */
}
```

Use reverse conversion table

INKJET RECORDING METHOD, INKJET RECORDING MEDIUM, AND AQUEOUS INK

This application is a 371 of PCT/JP09/055730 field Mar. 17, 2009.

TECHNICAL FIELD

The present invention relates to a recording medium, an aqueous ink, an ink and recording medium set (ink media set), an inkjet recording method and an ink record using the ink and recording medium set, in which high grade printing, image gloss and texture close to that of offset printing can be formed by use of an aqueous inkjet system at low cost on a printing paper (medium) having low white paper (background) gloss, such as a matte or dull recording medium for offset printing.

BACKGROUND ART

Currently, the development of both ink and media allows an aqueous inkjet recording system to attain high image quality in a level of photo image quality, and many users use the aqueous inkjet recording system for this reason. However, in the commercial print field, the aqueous inkjet recording system has not been widely used, but used in a limited field, such as printing of address of direct mails and ledger sheet, proof output for confirming conditions of offset print, and the like. This is because as paper (medium) special paper which is designed to increase absorption of the inkjet ink is necessary to output high quality image print in the aqueous inkjet system.

In a commercial printing field where a printing cost, speed, and image quality are severely demanded, coated papers (coated paper for commercial print) are generally used for offset printing or gravure printing, in any printing methods. These media are very inexpensive, but not designed for the aqueous inkjet recording method. An inkjet recording method using the aqueous ink, in which image quality comparable to commercial printing can be output on those media at adequately high speed, has not been achieved yet. When the aqueous inkjet printing is performed on the common coated paper for commercial printing, many problems occur, for example, image bleeding and dry failure, due to the poor ink absorption ability and wettability of the coated paper. Therefore, currently the aqueous inkjet recording method cannot be practically used in the commercial printing field.

Recently, matte and dull media are preferably used in high grade printing in terms of viewability of characters or images and their texture. However, a print is demanded to be finished so as to have a matte background and a glossy image in order to exhibit high grade image quality for catalogs of merchandise. In offset printing, image gloss is usually controlled in such a manner that the image gloss can be exhibited in a background without gloss by effectively designing an ink, on the other hand, the image gloss can be lost by mixing medium with an ink. In aqueous inkjet recording, the image gloss is exhibited by use of so-called inkjet glossy papers, which are glossy media having high background gloss, or by subjecting an image formed part to gloss treatment using a transparent ink specialized for post-treatment as described in Patent Literature 1. However, when media having low background gloss, such as inkjet matte coated paper are inkjet-printed, image gloss is low, and high grade image is hard to be exhibited. When an aqueous ink is directly printed on commercial printing media such as A2 grade matte coated paper or A2 grade dull coated paper by the conventional aqueous inkjet system, the ink is not suitably absorbed in the media, causing image bleeding in general. When printing is performed with decreased amount of ink adhesion to prevent bleeding, image density is decreased and image quality cannot be exhibited. When the transparent ink specialized for gloss treatment is printed on the media, the ink is not suitably absorbed in the media, and a uniform and beautiful gloss comparable to that by offset printing cannot be obtained. Moreover, in the commercial printing field, printing cost is highly emphasized, therefore, it is not at all practical to use expensive inkjet media for catalogs, leaflets distribution and the like.

In a field of variable print, in which a part of an image is printed by offset printing beforehand, and then another image is merge-printed as necessary, the aqueous inkjet recording technology is expected to be applied. However, the inkjet recording cannot be suitably performed on the media, when both offset printing suitability and cost reduction are demanded to be achieved. Realistically, the aqueous inkjet recording technology can be applied in such a degree as to merge characters such as address. On the other hand, when the inkjet suitability of the media is enhanced so as to merge a beautiful image by the inkjet system, the offset printability of the media may be decreased, or the cost of the media may be increased. The inkjet suitability and offset printability are incompatible. Particularly, in the case of a production of a publication using a matte or dull medium, when an image is merged by the inkjet printing method afterward, the image has no gloss, which greatly differs from an image obtained by offset printing. Therefore, the aqueous inkjet recording technology in the field of variable print is used in very limited application areas and is hard to be applied in general commercial use in the current situation.

Patent Literature 2 discloses a method for obtaining image gloss by subjecting an image printed on a commercial printing medium to calender treatment. By this method, background gloss is also changed, thus, it does not satisfy the aim of exhibiting image gloss on a matte texture or dull texture.

Patent Literature 3 discloses an inkjet recording method using a pigment ink and a medium having a gloss at an angle of 60 degrees of 10% to 30% and a center surface roughness Ra of 0.6 μm to 4 μm. This method is aimed to prevent decrease of image gloss relative to a background, and intended for a matte gloss medium having relatively high background gloss. Therefore, this method does not meet an object of the present invention.

Particularly, in the case of a pigment inkjet ink, usually the image gloss is lower than the background gloss of a medium, which outstandingly occurs in glossy media, except that the image gloss is enhanced by bronzing of a coloring pigment. Many of conventional arts are aimed to improve the decrease of gloss. When the inkjet pigment ink is used to print on commercial printing media, offset due to color rub-off outstandingly occurs. This is because, in the case of the inkjet ink, a coloring pigment tends to remain on a medium surface, and a large amount of a resin cannot be contained in the ink, in comparison with an offset ink. Thus, the fixability of the pigment is poor, and serious problems occur with regard to images to rubbing, specifically, even though an initial image can be finely printed, the coloring pigment is separated during handling, or set-off occurs by stacking paper.

The inventors of the present invention have studied an inkjet recording method which enables to obtain a texture close to that of commercial printing at low cost, for the purpose of applying the inkjet recording method using an aqueous pigment in the commercial printing field.

In order to solve the above-mentioned problems, Patent Literature 4 suggests a method for forming images on commercial printing media at low cost by combining a pigment ink having high penetration ability and a recording medium that has low ink absorption ability by contrast with the conventional media. By this method, only a solvent (water or an organic solvent) for forming the ink is selectively infiltrated into the substrate by printing using a small amount of a pigment ink having ultrahigh penetration ability on a recording medium having provided thereon a coat layer for inhibiting ink absorption (penetration) so that the coloring pigment contained in the ink is not infiltrated intensively into the medium, and the coloring material (pigment) contained in the ink can be remained on the medium surface with good efficiency, without using any special material such as a cation fixing agent. As a result, both a sufficient density and drying ability can be realized with a small amount of ink. Moreover, because the coloring material contained in the ink is caused to remain effectively on the medium surface, high transparency of the layer that has been a necessary function in the conventional recording media becomes unnecessary. Therefore, the degree of flexibility of material configuration of the coat layer can be greatly increased. By applying this method, it is possible to perform inkjet recording even on paper with low ink absorption ability such as commercial printing paper or publication printing paper. This method enables to reproduce offset printing images on media having relatively high background gloss. However, on media having matte texture or dull texture, images can be printed but image gloss is hard to be exhibited. It has been difficult to reproduce so-called offset print image quality.

Patent Literature 1: Japanese Patent (JP-B) No. 3799995
Patent Literature 2: Japanese Patent Application Laid-Open (JP-A) No. 2004-62202
Patent Literature 3: Japanese Patent (JP-B) No. 3669314
Patent Literature 4: Japanese Patent Application Laid-Open (JP-A) No. 2007-144975

DISCLOSURE OF INVENTION

In view of above mentioned achievement, the present invention is made to solve the problems.

That is, an object of the present invention is to provide an inkjet recording method which enables to easily print a print having high grade printing, and texture close to that of a commercial print, at high speed and low cost, and particularly enables to obtain high image gloss on a medium having matte texture or dull texture, as in offset printing system, by use of an medium, ink and recording method according to the present invention. Moreover, the inkjet recording method can be combined with offset printing so as to provide a suitable aqueous inkjet recording system for on-demand print and variable print.

Means for solving the above-described problems are described below:

<1> An inkjet recording method including printing an image on a recording medium using an aqueous ink, wherein the recording medium contains a support containing a cellulose pulp, and a coat layer containing a pigment and a binder, and optionally containing a cationic additive in an amount of 0.1% or less in the total amount of the coat layer, the coat layer formed in a form of one or more layers on at least one surface of the support, wherein the recording medium has an outermost layer of the coat layer having a gloss at an angle of 60 degrees in accordance with JIS-ZS-8741 of 13 or less, and a centerline average roughness Ra of 0.2 µm to 2.5 µm at a cut-off value of 0.8 µm, and wherein the aqueous ink contains coloring particles, a resin emulsion, water, and a wetting agent, wherein the aqueous ink has a solid content of 3% by mass or more.

<2> The inkjet recording method according to <1>, wherein the recording medium contains SBR latex and any one of starch and cationized starch as the binder and calcium carbonate as an inorganic pigment in the coat layer.

<3> The inkjet recording method according to <1> or <2>, wherein the aqueous ink containing the coloring particles, glycerin, a water soluble organic solvent, the water, a surfactant, and the resin emulsion, wherein the aqueous ink has a surface tension of 15 mN/m to 30 mN/m.

<4> The inkjet recording method according to any one of <1> to <3>, wherein the aqueous ink contains a dispersible colorant having an average particle diameter of 0.01 µm to 0.16 µm as a colorant.

<5> The inkjet recording method according to any one of <1> to <4>, including jetting the aqueous ink from an inkjetting unit so as to form an image on the recording medium by applying a stimulus.

<6> The inkjet recording method according to <5>, wherein the stimulus is at least one selected from the group consisting of heat, pressure, vibration and light.

<7> The inkjet recording method according to any one of <1> to <6>, wherein the aqueous ink is adhered on the recording medium in a maximum amount of 20 g/m².

<8> A recording medium for offset printing and inkjet printing containing a support containing a cellulose pulp, and a coat layer containing a pigment and a binder, and optionally containing a cationic additive in an amount of 0.1% or less in the total amount of the coat layer, the coat layer formed in a form of one or more layers on at least one surface of the support, wherein the recording medium has an outermost layer of the coat layer having a gloss at an angle of 60 degrees in accordance with JIS-ZS-8741 of 13 or less, and a centerline average roughness Ra of 0.2 µm to 2.5 µm at a cut-off value of 0.8 µm, and contains SBR latex and any one of starch and cationized starch as the binder and calcium carbonate as an inorganic pigment in the coat layer.

<9> An aqueous ink for inkjet recording containing coloring particles, a resin emulsion, water, glycerin, a water soluble organic solvent, and a surfactant, wherein the aqueous ink has a solid content of 3% by mass or more and an surface tension of 15 mN/m to 30 mN/m, and the aqueous ink is used for inkjet recording an image on a recording medium which contains a support containing a cellulose pulp, and a coat layer containing a pigment and a binder, and optionally containing a cationic additive in an amount of 0.1% or less in the total amount of the coat layer, the coat layer formed in a form of one or more layers on at least one surface of the support, wherein the recording medium has an outermost layer of the coat layer having a gloss at an angle of 60 degrees in accordance with JIS-ZS-8741 of 13 or less, and a centerline average roughness Ra of 0.2 µm to 2.5 µm at a cut-off value of 0.8 µm.

According to the recording method of the present invention, an inkjet recording image having image gloss can be provided at a high speed by using a recording medium having matte or dull texture close to that of general commercial printing, or a commercial printing medium itself and the recording method of the present invention can be advantageously applied to an ink record, inkjet recording apparatus, and inkjet recording method. Further, the obtained print is excellent in resistance of images to rubbing and handling ability immediately after printing.

The inkjet recording method of the present invention are applicable to various types of recording by an inkjet recording system, and in particular advantageously applicable, for example, to printers, facsimile devices, copiers, and printer/fax/copier multipurpose machines for inkjet recording.

According to the present invention, outstandingly excellent effect can be obtained, specifically, a highly reliable recording method of achieving high grade printing at high speed and low cost can be provided, when inkjet recording is performed.

BRIEF DESCRIPTION OF DRAWINGS

FIG. 12 shows an explanatory view of total amount control processing.

BEST MODE FOR CARRYING OUT THE INVENTION

[Recording Medium]

Figure 1:
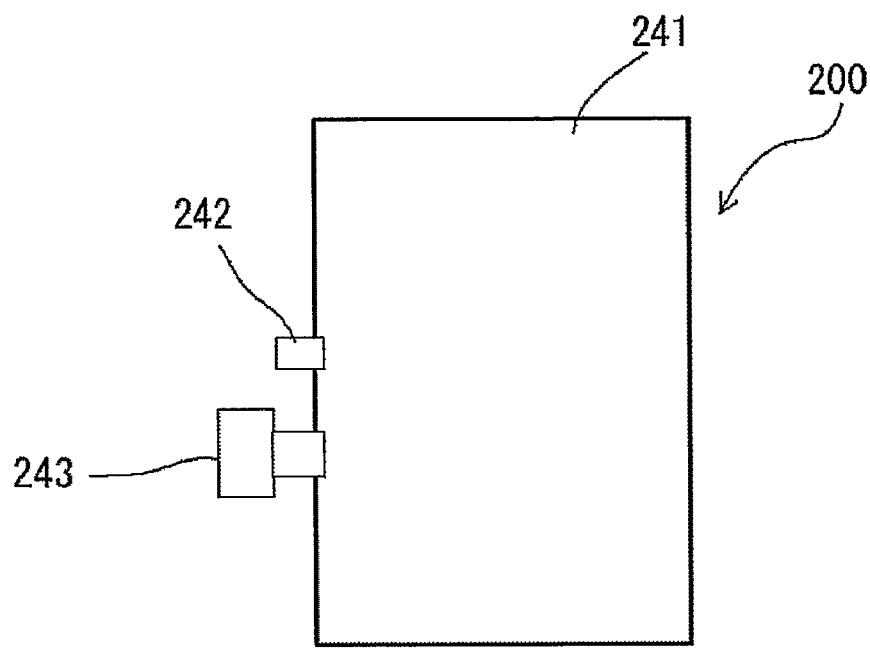
FIG. 1 shows a schematic view of an example of an ink cartridge used in the present invention.

Hereinafter, an inkjet recording medium of the present invention will be explained in detail.

To achieve an inkjet recording method which provides high image reliability and high post-treatment properties at low cost and high speed, and an image close to that of an offset printed image consisting of a matte background and glossy image, formulations of a recording medium and an ink, and their compatibility have been studied, wherein image quality of commercial printing is attained not by modifying the formulation of a coat layer of the conventional coated paper specialized for inkjet, but by using an aqueous ink having ultrahigh penetration ability and a recording medium (hereinafter also referred to as "medium") which is produced in consideration of formulation of an offset printing medium.

Specifically, according to the studies by the inventors of the present invention, it is possible to attain a medium on which a high quality image can be printed at high speed and low cost by specifically controlling the shape of a surface of the coat layer of the medium and using an aqueous inkjet ink having ultrahigh penetration ability even with a high solid content, and to obtain an image having a texture very close to that of offset printing and having high image gloss when printing on the medium having matte texture or dull texture. Moreover, it has been found that any commercial printing media which satisfy the conditions of the present invention can be used as a medium of the present invention.

<Support>

The support used in the present invention is one produced by mixing chemical pulps, mechanical pulps, recycled pulps and the like at a predetermined ratio, optionally adding therein an internally adding sizing agent, a yield improving agent, a paper strength additive, and the like, and making paper from the mixture by means of a fourdrinier former, a gap-type twin-wire former, or a hybride former that is a fordrinier having its latter part modified with twin-wire.

The pulps used for the support may contain: virgin chemical pulp (CP) which is obtained by chemically treating wood and its fibrous material, such as a bleached hardwood kraft pulp, a bleached softwood kraft pulp, an unbleached hard wood kraft pulp, an unbleached soft wood kraft pulp, a bleached hard wood sulfite pulp, a bleached softwood sulfite pulp, an unbleached hardwood sulfite pulp, an unbleached softwood sulfite pulp, and the like; and virgin mechanical pulp (MP) which is obtained by mechanically treating wood and its fibrous material, such as a ground pulp, a chemi-ground pulp, a chemi-mechanical pulp, a semi-chemical pulp, and the like.

The recycle pulp can also be used in the support, and raw materials of the recycle pulp are, for example, papers defined as terms of "high white", "line white", "cream white", "card", "special white", "mild white", "imitation", "pale", "Kent", "white art", "special high cut", "separate high cut", "news paper", "magazine", and the like in Standard Chart of Recycled Paper, produced by Paper Recycling Promotion Center that is Japanese non-profit foundation (the above-mentioned definitions can be found in the chart). Specific examples thereof include printing papers such as a non-coated paper for personal computers, that is paper for information technology or the like, a thermosensitive paper, a pressure sensitive paper, and the like for printers; a recycled OA paper such as paper for PPC; coat paper such as an art paper, a coated paper, a slightly coated paper, a matte paper, and the like; recycle papers or cardboards of high quality papers, of high quality color papers, of a paper from note books, of a paper from letter pads, of lapping papers, of fancy papers, of middle quality papers, of news paper, of bank papers, of lapping papers used in supermarkets, of imitation papers, of pure-white rolling papers, of non-coated papers such as milk cartons, and the like, and those examples listed above are papers containing chemical pulps, papers containing high yield pulps, and the like. These may be used alone or in combination.

The recycled pulp is generally produced by the combination of the following four steps.

(1) Breaking out of a recycled paper is carrier out by treating the paper with mechanical force or chemical by means of a pulper so as to break down to fibers, and detaching the printing ink from the fibers.

(2) Removal of dusts is carried out by removing foreign substances (for example, plastics and the like) and dusts contained in the recycled paper by a screen or a cleaner.

(3) Removal of an ink is carrier out by removing the detached ink from the fibers using a surfactant in accordance with a flotation method or washing method, to thereby remove from the system.

(4) Bleaching is carrier out by using an oxidation reaction or a reduction reaction to thereby increase whiteness of the fibers.

In the case where the recycled pulp is added to the pulp used for the support, the mixing amount of the recycled pulp is preferably 40% by mass or less based on the total amount of the pulp for the purpose of preventing curling of the support after recording.

As a filler which can be used in the support, calcium carbonate is effective, but calcium carbonate can be used in combination with inorganic additives such as silicas, for example, kaolin, calcined clay, pyrophylite, sericite, talc, and the like; organic pigments such as satin white, barium sulfate, calcium sulfate, zinc sulfate, and a plastic pigment, a urea resin, and the like.

The internally adding sizing agent used in the support is not particularly limited and may be suitably selected from conventional internally adding sizing agents used for inkjet recording media and commercial printing media. Suitable internally adding sizing agents are, for example, a rosin emulsion sizing agent, and the like. In order to increase a surface pH of paper, a neutral rosin sizing agent used for making neutral paper, alkenyl succinic anhydride (ASA), alkyl ketene dimer (AKD), petroleum resin sizing agent, or the like is preferably used. Of these, the neutral rosin sizing agent or alkenyl succinic anhydride is particularly suitable.

The amount of the internally adding sizing agent is 0.1 parts by mass to 0.7 parts by mass relative to 100 parts by mass of bone-dry pulp, but it is not limited thereto.

The internal additives used in the support are, for example, conventionally known pigments as a white pigment. Examples of the white pigments include inorganic white pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, silious earth, calcium silicate, magnesium silicate, synthetic silica, aluminum hydroxide, alumina, lithopone, zeolite, magnesium carbonate and magnesium hydroxide; organic pigments such as styrene plastic pigment, acrylic plastic pigment, polyethylene, microcapsule, urea resin and melamine resin. These may be used alone or in combination.

<Coat Layer>

According to the present invention, the coat layer contains a pigment and binder, and further contains a surfactant and other components. The coat layer may consist of a layer or a plurality of layers. As the pigment, it is necessary to use a pigment used for producing so-called an offset printing paper, and to mainly contain calcium carbonate for the coat layer in order to satisfy matte background (an outermost layer of the coat layer), offset printing suitability and inkjet printing suitability. In order to give the background matte appearance, the background gloss at an angle of 60 degrees in accordance with JIS-ZS-8741 is preferably 13 or less, and more preferably less than 10. When the gloss is more than 13, reflected light becomes very noticeable depending on angles when the medium is visually observed under fluorescent light. Thus, the matte texture of the medium may not be exhibited. The minimum value of the gloss is not particularly limited. However, when the gloss is excessively low, high quality as a coated paper cannot be exhibited. Therefore, the background gloss is preferably 4 or more.

<Shape of Coat Layer>

It has been found that it is necessary that an ink contains the increased resin content and high concentration of the coloring material, and that a medium surface has an irregularity within a certain range, in order to exhibit image gloss in a medium having a matte or dull background gloss by inkjet printing. As for the range of the irregularity on the medium surface, the medium needs to have a centerline average roughness Ra in accordance with JISB-0601 of 0.2 μm to 2.5 μm. When it is less than 0.2 μm, the background gloss is too high to obtain matte texture or dull texture. When it is more than 2.5 μm, the image gloss cannot be exhibited even though the medium is printed with the ink of the present invention. Particularly, the centerline average roughness Ra is preferably approximately 0.5 μm, because high grade with clear contrast can be obtained in the case where the difference between the background gloss and image gloss is large.

<Material of Coat Layer>

Calcium carbonate is essential to produce the matte coat layer at low cost. The calcium carbonate is broadly classified into light calcium carbonate and heavy calcium carbonate. In the present invention, light calcium carbonate and heavy calcium carbonate are preferably used in combination. Moreover, these calcium carbonates are preferably relatively finely pulverized so as to have a diameter of 0.7 μm to 5 μm, and more preferably 1.0 μm to 5 μm. When a large amount of the calcium carbonate having a diameter of less than 0.7 μm is used, production cost may be lower, but gaps between pigments in the coat layer is decreased, thereby decreasing the carrier absorption ability of the ink. On the other hand, when a large amount of the calcium carbonate having a diameter of more than 5 μm is used, the carrier absorption ability of the ink increases, but the surface roughness is also increased, thereby hard to exhibit the image gloss after printing. Naturally, these may be used in combination. When the coat layer is formed by adding only the light calcium carbonate as the pigment, the production cost may be high. Therefore, the light calcium carbonate is preferably used by mixing with the heavy calcium carbonate having a small diameter. The amount of the heavy calcium carbonate is preferably up to 80% by mass, relative to 100% by mass of the total pigment in the coat layer.

Conventionally, the matte texture is often attained by increasing surface roughness of a medium. However, when this technique is used in the present invention, it becomes difficult to attain sufficient image gloss and a plate application is likely to be unevenly performed upon offset printing, dot reproducibility is decreased, and offset suitability may be decreased. The matte texture can be controlled by mixing calcium carbonates of different crystals or having spindle-shape, by decreasing the amount of the binder resin, or by increasing types of binder resins, without increasing the surface roughness.

Other pigments, such as kaolin or clay can be used, as necessary. Examples of kaolins include delaminated kaolin, calcinated kaolin and hydrokaolin. The small amount of kaolin is preferably used when a medium having dull texture is produced. When the amount of the kaolin is excessively large, gloss is easily exhibited by rubbing, thereby decreasing quality of a print. Moreover, the carrier absorption ability of the ink is decreased, and drying property is decreased. The amount of the kaolin is preferably up to 60% by mass, relative to 100 parts by mass of the total amount of pigments in the coat layer.

In the present invention, when the ink absorption speed is excessively high, the image gloss is not easily exhibited. However, the ink absorption speed can be suppressed by adding an adequate amount of kaolin, so as to easily exhibit the image gloss.

Moreover, a pigment, such as silica and alumina hydrate, for inkjet paper can be used in combination depending on the purpose, in a range where offset printing suitability is not decreased. Naturally, the inkjet suitability is enhanced by containing these pigments. However, these pigments are quite expensive, and use of a large amount thereof decreases the image gloss and offset suitability. Therefore, it is preferable that these pigments be not used.

Moreover, other inorganic pigments and organic pigments can be used as necessary, as long as the above conditions are satisfied.

Examples of inorganic pigments include talc, calcium sulfite, titanium white, magnesium carbonate, titanium dioxide, aluminum hydroxide, calcium hydroxide, magnesium hydroxide, zinc hydroxide, and chlorite.

Examples of organic pigments include aqueous dispersion of particles such as styrene-acryl copolymer particles, styrene-butadiene copolymer particles, polystyrene particles and polyethylene particles. These organic pigments may be used in combination.

The organic pigments can have a dense solid form, hollow form, or doughnut-like form. From the standpoint of the balance between gloss developing ability, surface coatability, and flowability of the coating liquid, a hollow pigment preferably having an average particle diameter of 0.2 µm to 3.0 µm, and more preferably having a void ratio of 40% or more is used.

<Materials Constituting Coat Layer: Binder>

The binder of the coat layer used in the present invention is particularly preferably a certain aqueous resin emulsion that has a high adhesion force with the pigment constituting the coat layer and the base paper and causes no blocking. Moreover, the binder of the coat layer particularly preferably matches an ink used for commercial printing paper. In order to avoid piling or tinting which cause troubles in printing, the coat layer particularly preferably contains a styrene-butadiene (SBR) latex which is hardly used for inkjet paper, in addition to starch or modified starch used in paper for general commercial printing. Generally, when the SBR latex is added in an inkjet medium, the surface of the medium becomes hydrophobic, decreasing wettability of inkjet ink. The SBR latex is not compatible with a cation agent as a fixing agent for inkjet ink. Therefore, conventionally, the SBR latex is hardly used for the inkjet paper. However, it is particularly preferably used for enhancing offset printability.

The styrene-butadiene latex may be a copolymer latex that is generally used for coating on paper, such latex being obtained by copolymerization of styrene and butadiene as monomers and, if necessary, other monomers, or by modifying a copolymer by a chemical reaction. Examples of suitable other monomers include acrylic acid, methacrylic acid, and alkyl esters of acrylic acid or methacrylic acid, acrylonitrile, maleic acid, fumaric acid, and vinyl monomers such as vinyl acetate. Crosslinking agents such as methylolated melamine, methylolated urea, methylolated hydroxypropylene urea, and isocyanates may be also contained, and compositions having self-crosslinking ability that are copolymers containing units such as N-methylol acrylamide may be also used. These may be used alone or in combination.

The styrene-butadiene latex is not particularly limited, and other aqueous binders may be used in combination as long as these resins are contained therein.

Examples of starches include an oxidized starch, esterified starch, ferment-modified starch, and cationized starch.

Examples of suitable aqueous binders include fibrous derivatives such as casein, soybean proteins, carboxymethyl cellulose, hydroxyethyl cellulose; styrene-acryl resins, isobutylene-maleic anhydride resins, acrylic emulsions, vinyl acetate emulsions, vinylidene chloride emulsions, polyester emulsions and acryl nitride butadiene latex.

The amount of the aqueous binder in the coat layer used in the present invention is preferably 5% by mass to 30% by mass, more preferably 10% by mass to 20% by mass of the total solid content of the coat layer. When the amount of the aqueous binder is small, the adhesion force is insufficient, and thus the strength of the ink receiving layer and internal bonding strength may be decreased to cause powder fall.

Other components can be added to the coat layer used in the present invention as necessary, within a range in which the object of the present invention can be attained and the effect thereof is not lost. Examples of the other components include various assisting agents which are mixed in pigments for general coated paper, such as dispersants, thickening agents, water-retaining agents, antifoaming agents, and water resistant additive, and also additives such as pH adjusting agents, antiseptic agents and antioxidants.

Surfactants used in the coat layer are not particularly limited and may be appropriately selected according to the purpose. Any of anionic surfactants, cationic surfactants, amphoteric surfactants, and nonionic surfactants can be used. Of these, nonionic surfactants are particularly preferred. Addition of the surfactants enables to improve water resistance of images and also to increase the image density, thereby preventing bleeding.

Examples of nonionic surfactants include ethylene oxide adducts of higher alcohols, ethylene oxide adducts of alkyl phenols, ethylene oxide adducts of fatty acids, ethylene oxide adducts of polyhydric alcohol fatty acid esters, ethylene oxide adducts of higher aliphatic amines, ethylene oxide adducts of fatty acid amides, ethylene oxide adducts of oils and fats, ethylene oxide adducts of polypropylene glycol and, fatty acid esters of glycerol, fatty acid esters of pentaerythritol, fatty acid esters of sorbitol and sorbitan, fatty acid esters of sucrose, alkyl ethers of polyhydric alcohols, and fatty acid amides of alkanolamines. These may be used alone or in combination.

The polyhydric alcohols are not particularly limited and may be appropriately selected according to the purpose. Examples thereof include glycerol, trimethylolpropane, pentaerythritol, sorbitol, and sucrose. As for the ethylene oxide adducts, compounds in which ethylene oxide is partially substituted with an alkylene oxide such as propylene oxide or butylene oxide can be also used effectively, as long as water-solubility is maintained. The substitution ratio is preferably 50% or less. The HLB (hydrophilic-lipophilic balance) of the nonionic surfactant is preferably 4 to 15, more preferably 7 to 13.

In the present invention, a cationic organic compound is not necessary to be added in the coat layer, in contrast to the common inkjet media. If necessary, a minimum amount, 0.1% by mass or less, of the cationic organic compound may be optionally added in the total amount of the coat layer. The cationic organic compound gives offset printability to the coat layer and prevents decrease of productivity due to thickening of a coating solution for the coat layer during production. When the amount of the cationic organic compound is more than 0.1% by mass, the coating solution tends to thicken, and when the amount of the cationic organic compound is further increased, the coating solution outstandingly thickens to a degree where the coating solution cannot be applied.

Examples of cationic organic compounds include dimethylamine-epichlorohydrin polycondensate, dimethylamine-ammonia-epichlorohydrin polycondensate, poly(trimethylamine ethyl methacrylate-methyl sulfate), diallylamine hydrochloride-acrylamide copolymer, poly(diallylamine hydrochloride-sulfur dioxide), polyallylamine hydrochloride, poly(allylamine hydrochloride-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt condensate, dimethyl diallyl ammonium chloride, polydiallyl methyl amine hydrochloride, poly(diallyldimethyl ammonium chloride), poly(diallyldimethyl ammonium chloride-sulfur dioxide), poly(diallyldimethyl ammonium chloride-diallylamine hydrochloride derivative), acrylamide-diallyldimethyl ammonium chloride copolymer, acrylic acid salt-acrylamide-diallylamine hydrochloride copolymer, polyethyleneimine, ethyleneimine derivatives such as acrylamine polymer, and modified polyethyleneimine alkylene oxide. These may be used alone or in combination.

<Production of Coat Layer>

A method for forming the coat layer over the support is not particularly limited and may be selected from a method for directly coating, a method for coating temporarily on another base material, and then transferring to a base paper, and a method for atomizing using a spray or the like. Examples of the method for directly coating include a roll-coater method, an air-knife coater method, a gate-roll coater method, a size-press method, a shim-sizer method, a film transfer system such as rod-metalling size press coater and a blade coater system by fountain or roll application.

The amount of the coated solution for coat layer is not particularly limited and may be appropriately selected according to the purpose. It is preferred that the amount of solid content be 5 g/m$^2$ to 20 g/m$^2$. When the amount is less than 5 g/m$^2$, the ink coloring component cannot be sufficiently separated. As a result, the coloring material penetrates the paper, causing decrease in concentration or bleeding of characters.

Drying may be performed as necessary, after impregnation or coating of the solution. The drying temperature in this case is not particularly limited and may be appropriately selected according to the purpose. The temperature is preferably about 100° C. to 250° C.

The drying treatment of the coat layer can be performed, for example, by using a hot-blow drying furnace or a hot drum.

The medium of the present invention is subjected to calender treatment to obtain a desired glossiness after drying the coat layer.

The calender treatment is not particularly limited and may be appropriately selected according to the purpose. Examples thereof include super calender, soft calender and gloss calender. Examples of methods for controlling gloss include control of the number of steps of calendering, control of nip pressure, control of linear speed, and control of calendering temperature.

The basis weight of the recording medium of the present invention is preferably 50 g/m$^2$ to 250 g/m$^2$. When it is less than 50 g/m$^2$, the stiffness is insufficient and conveying defects easily occur, for example, the conveying path can be clogged with the recording medium. When the basis weight of recording medium is more than 250 g/m$^2$, the stiffness is too high and the recording medium is not bent in the curved portions of the conveying path, thereby causing conveying defects such as clogging of the conveying path with the recording medium.

[Aqueous Ink]

The ink of the present invention is invented for application to media having poor ink absorption ability. The ink has a surface tension ($\sigma$) lower than that of the typical inkjet ink, thereby being excellent in wettability, and the carrier contained in the ink has high penetration ability with respect to media having less pores, thus the ink viscosity increases significantly with the penetration of even very small amounts of carrier. As a result, the adjacent dots hardly merge together after landing to the surface and dots can be formed in a stable manner even on media having very poor ink penetration ability in which the adjacent dots simply merge together. Further, because a coloring material remains on the surface and practically does not penetrate the media, it is not necessary to place the droplets on the same address, and sufficient color and image density can be obtained with a very small total amount of ink.

Because an image is formed with a total amount of ink that is greatly smaller than that of the conventional inks, the amount of carrier that has to penetrate the media is decreased, curling and cockling are practically eliminated, and the rigidity of paper after printing is almost equal to that before the printing. As a result, printing can be performed without damaging the support even on the media for which the absorption of ink has not been considered. Moreover, because of high wettability, the ink is highly resistant to fingerprint left on a medium by touching with fingers, enabling to attain uniform print. When an ink having a high surface tension is used, the ink is repelled according to left fingerprint, thereby forming spots.

When the absorption of carrier ends after an ink droplet has been placed on the media surface, the coloring material sets in a state where a very small amount of wetting agent is contained. This is almost identical to the state obtained immediately after offset printing is performed with an ink using soybean oil. At this time, it is necessary that the coloring material and binder component remaining on the surface be homogeneously mixed, and that leveling sufficiently occurs so as to have a smooth surface.

<Surface Tension of Ink>

As a condition of the aqueous ink necessary for the present invention, it has been found that the aqueous ink has very high penetration ability regardless of high solid contents, and a surface tension of 30 mN/m or less. When the surface tension is more than 30 mN/m, the penetration of ink is delayed and an image bleeding occurs. Therefore, a high quality image cannot be attained. The lower the surface tension is, the higher the separation ability of the pigment and solvent becomes. Thus, a lower surface tension is preferred. The surface tension of ink can be easily adjusted by the amount of a penetrating agent (EHD) and the amount of a fluorine surfactant FS300.

The ink having ultrahigh penetration of the present invention can be also printed on the conventional porous media specialized for inkjet printing. However, because the ink absorption rate in the conventional porous media is much higher than that in the recording medium of the present invention, on which printing is performed using the ink, after the ink droplets land to the medium surface, the solvent penetrates the medium before the dots spread over the surface, thereby decreasing the dot diameter. As a result, the concentration easily decreases and graininess increases. Therefore, in order to produce a high quality image, it is necessary to perform printing by increasing resolution over that of the recording medium of the present invention. As a consequence, the printing speed decreases and the consumption of ink increases. Therefore, it is desirable that the recording media of the present invention be used.

The surface tension of the ink at 25° C. is preferably 15 mN/m to 30 mN/m, and more preferably 20 mN/m to 25 mN/m. When the surface tension is less than 15 mN/m, the nozzle plate used in the present invention is excessively wetted and ink droplets cannot be properly formed, bleeding on the recording medium of the present invention becomes significant and stable discharge of ink may not be attained. When the surface tension is more than 40 mN/m, the ink sometimes insufficiently penetrates the recording medium, thereby causing beading, and the extension of drying time.

The surface tension of an ink is measured, for example, by a surface tensiometer (CBVP-Z manufactured by Kyowa Interface Science Co., Ltd.) using a platinum plate at a temperature of 25° C.

<Solid Content of Ink>

The solid content of the ink of the present invention is preferably 3% by mass or more. When the concentration is lower than 3% by mass, the increase in viscosity during drying is slow and the image tends to bleed easily. The higher the solid content, the more preferred. However, if it is too high, nozzle clogging heavily occurs and loss of image easily occurs. Therefore, it is desirable that the solid content be 5% by mass to 15% by mass.

The ink of the present invention contains at least water, coloring particles, a fixing agent for colorant, and a water soluble organic solvent, a wetting agent such as glycerin and a surfactant, wherein the ink has a surface tension of 15 mN/m to 30 mN/m. The ink further contains a penetrating agent and other components, as necessary.

—Colorant—

The color of the ink is not particularly limited and may be appropriately selected according to the purpose. Examples of the colors include yellow, magenta, cyan, and black. When recording is performed by using an ink set employing the combination of two or more colors, a multicolor image can be formed, and when recording is performed by using an ink set employing a full-color combination, a full-color image can be formed.

Examples of colorants include dyes such as water-soluble dyes, oil-soluble dyes and dispersed dyes, and pigments. Oil-soluble dyes and dispersed dyes are preferred from the standpoint of adsorption ability and sealing ability, but pigments can be advantageously used to ensure light resistance of the image to be obtained.

From the standpoint of effective impregnation into the fine polymer particles, it is preferred that the dyes be dissolved to a concentration of 2 g/L or more, more preferably 20 g/L to 600 g/L, in an organic solvent such as a ketone solvent.

The water-soluble dyes can be classified into acidic dyes, direct dyes, basic dyes, reactive dyes, and food dyes, based on the color index thereof, and it is preferred that dyes excelling in water resistance and light resistance be used.

Self-dispersible pigments in which at least one hydrophilic group is bonded directly or via another atomic group to the pigment surface and which can be dispersed with good stability, without using a dispersant, can be advantageously used as the pigments. As a result, a dispersant that has been used in the conventional inks to disperse the pigment is not necessary. Ionic pigments are preferred as the self-dispersible pigments, and anionically charged pigments are particularly preferred.

The self-dispersible pigment has a volume-average particle size of preferably 0.01 μm to 0.16 μm in the ink.

Examples of anionic hydrophilic groups include —COOM, —SO$_3$M, —PO$_3$HM, —PO$_3$M$_2$, —SO$_2$NH$_2$, —SO$_2$NHCOR (where M stands for a hydrogen atom, an alkali metal, ammonium, or an organic ammonium; R is an alkyl group having 1 to 12 carbon atoms, a substituted or unsubstituted phenyl group, or a substituted or unsubstituted naphthyl group). Of these, pigments in which —COOM and —SO$_3$M bonded to the color pigment surface are preferably used.

As for "M" in the aforementioned hydrophilic groups, examples of suitable alkali metals include lithium, sodium, and potassium. Examples of organic ammonium include mono- to trimethylammonium, mono- to triethylammonium, and mono- to trimethanolammonium. Examples of methods for obtaining the anionically charged color pigments include methods by which —COONa is introduced into the color pigment surface, such as a method using oxidization of the color pigment with sodium hypochlorite, a method using sulfonation treatment, and a method using reaction with a diazonium salt.

A pigment dispersion using a pigment dispersant can be also used in the present invention.

Examples of pigment dispersants include natural hydrophilic polymer compounds such as vegetable polymers, e.g., gum arabic, tragacanth gum, gua gum, karaya gum, locust bean gum, arabinogalactan, pectin, and queen's seed starch; seaweed polymers such as alginic acid, carrageenen, and agar; animal polymers such as gelatin, casein, albumen, and collagen; and microorganism polymers such as xanthene gum and dextran. Examples of suitable semisynthetic materials include fibrous polymers such as methyl cellulose, ethyl cellulose, hydroxyethyl cellulose, hydroxypropyl cellulose, and carboxymethyl cellulose; starch polymers such as sodium glycolate starch and sodium ester phosphate starch; seaweed polymers such as sodium alginate and propylene glycol ester alginate. Examples of pure synthetic materials include vinyl polymers such as polyvinyl alcohol, polyvinyl pyrrolidone, and polyvinyl methyl ether; acrylic polymers such as non-crosslinked polyacrylamide, polyacrylic acid or alkali metal salt thereof, and water-soluble styrene acrylic resin; and natural polymer compounds such as water-soluble styrene maleic acid resin, water-soluble vinyl naphthalene acrylic resin, water-soluble vinyl naphthalene maleic acid resin, polyvinyl pyrrolidone, polyvinyl alcohol, alkali metal salt of β-naphthalenesulfonic acid formalin condensate, polymer compounds having a salt of a cationic functional group such as quaternary ammonium or amino group in the side chain thereof, and shellac. Of these, compounds, in which a carboxyl group, such as homopolymers of acrylic acid, methacrylic acid, or styrene acrylic acid, or copolymers of monomers having other hydrophilic groups are introduced, are particularly preferred as the polymer dispersant.

The mass-average molecular mass of the copolymer is preferably 3,000 to 50,000, more preferably 5,000 to 30,000 and still more preferably 7,000 to 15,000. The mixing mass ratio of the pigment and the dispersant is preferably within a range of 1:0.06 to 1:3, more preferably within a range of 1:0.125 to 1:3.

Examples of cyan coloring material used in the present invention include C.I. Pigment Blue 1, 2, 3, 15 (Copper Phthalocyanine Blue R), 15:1, 15:2, 15:3 (Phthalocyanine Blue G), 15:4, 15:6 (Phthalocyanine Blue E), 15:34, 16, 17:1, 22, 56, 60, 63, C.I. Vat Blue 4, and Vat Blue 60. From the standpoint of cost and safety, Phthalocyanine Blue 15:3 is particularly preferred.

Coloring materials for other colors are not particularly limited, as long as they are coloring particles.

As the colorant, a colorant selected from any one of a pigment, dye, and colored fine particle is preferably used.

As the colored fine particles, an aqueous dispersion of fine polymer particles containing a coloring material selected from any one of a pigment and dye can be advantageously used.

The expression "containing . . . coloring material" herein means either of a state in which the coloring material is encapsulated inside the fine polymer particles, and a state in which the coloring material is adsorbed on the surface of fine polymer particles, or both such states. In this case, it is not necessary that the all coloring materials contained in the ink of the present invention be encapsulated in or adsorbed on the fine polymer particles, and the coloring material may be also dispersed in the emulsion within a range in which the effect of the present invention is not lost. The coloring material is not particularly limited, as long as it is insoluble or has poor solubility in water and can be adsorbed on the polymer, and the coloring material may be appropriately selected according to the purpose.

The expression "insoluble or has poor solubility in water" means that the coloring material is not dissolved in an amount of 10 parts by mass or more in 100 parts by mass of water at a temperature of 20° C. "Soluble" means that no separation or precipitation of the coloring material can be visually observed in the surface layer or lower layer of aqueous solution.

The volume-average particle size of fine polymer particles (colored fine particles) containing the coloring material is preferably 0.01 µm to 0.16 µm in the ink. When the particle size is less than 0.01 µm, the fine particles easily flow, thereby increasing the ink bleeding in character and degrading light resistance. On the other hand, the particle size is more than 0.16 µm, the nozzle is easily clogged and color development ability is decreased.

The amount of the colorant added to the ink is preferably 2% by 3% by mass to 12% by mass. When the amount of the colorant is less than 2% by mass, image density may be decreased due to lowered coloring strength, and feathering or bleeding may be adversely affected due to lowered viscosity. When the amount of the colorant is more than 15% by mass, a nozzle easily dries up, for example, when the inkjet recording apparatus is allowed to stand, resulting in a no-discharge phenomenon. Furthermore, due to the excessively high viscosity, penetration ability is decreased and dots less spread. Therefore, image density may be decreased and rough image may be obtained.

—Wetting Agent—

The wetting agent is not particularly limited and may be appropriately selected according to the purpose. For example, at least one selected from polyol compounds, lactam compounds, urea compounds, and saccharides is advantageously used.

Examples of polyol compounds include polyhydric alcohols, polyhydric alcohol alkyl ethers, polyhydric alcohol aryl ethers, nitrogen-containing heterocyclic compounds, amides, amines, sulfur compounds, propylene carbonates, and ethylene carbonate. These may be used alone or in combination.

Examples of polyhydric alcohols include ethylene glycol, diethylene glycol, triethylene glycol, polyethylene glycol, polypropylene glycol, 1,3-propanediol, 1,3-butanediol, 1,4-butanediol, 3-methyl-1,3-butanediol, 1,5-pentanediol, 1,6-hexanediol, glycerol, 1,2,6-hexanetriol, 1,2,4-butanetriol, 1,2,3-butanetriol, and petriol.

Examples of polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyhydric alcohol aryl ethers include ethylene glycol monophenyl ether and ethylene glycol monobenzyl ether.

Examples of nitrogen-containing heterocyclic compounds include N-methyl-2-pyrrolidone, N-hydroxyethyl-2-pyrrolidone, 2-pyrrolidone, 1,3-dimethylimidazolidinone, and ε-caprolactam.

Examples of amides include formamide, N-methylformamide, formamide, N,N-dimethyl formamide.

Examples of amines include monoethanolamine, diethanolamine, triethanolamine, monoethylamine, diethylamine, and triethylamine.

Examples of sulfur compounds include dimethylsulfoxide, sulfolan, and thiodiethanol.

Of these compounds, from the standpoint of obtaining excellent effect in solubility and preventing discharge failure due to moisture evaporation, glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, or N-hydroxyethyl-2-pyrrolidone is suitably used.

As the lactam compound, at least one selected from 2-pyrrolidone, N-methyl-2-pyrrolidone, N-hydroxyethyl-2-pyrrolidone, and ε-caprolactam may be used.

As the urea compound, at least one selected from urea, thiourea, ethyleneurea, and 1,3-dimethyl-2-imidazolidinone may be used. The amount of the urea compound added to the ink is generally preferably 0.5% by mass to 50% by mass and more preferably 1% by mass to 20% by mass.

Examples of saccharides include monosaccharides, disaccharides, oligosaccharides (including trisaccharides and tetrasaccharides), polysaccharides, and derivatives thereof. Of these, glucose, mannose, fructose, ribose, xylose, arabinose, galactose, maltose, cellobiose, lactose, sucrose, trehalose, and maltotriose are preferred; maltitose, sorbitose, gluconolactone, and maltose are particularly preferred.

The polysaccharides mean sugars in a broad sense and may include substances widely present in nature, such as α-cyclodextrin and cellulose.

Examples of the derivatives of the saccharides include reduced sugar of the saccharides (for example, sugar alcohol, represented by a general formula $HOCH_2(CHOH)_nCH_2OH$ (where n represents an integer of 2 to 5)), oxidized sugar (for example, aldonic acid and uronic acid), amino acids, and thio acid. Of these, sugar alcohol is preferred. Examples of sugar alcohols include maltitol and sorbitol.

The amount of the wetting agent contained in the ink is 10% by mass to 50% by mass and more preferably 20% by mass to 35% by mass. When the amount of the contained wetting agent is too small, a nozzle may easily dried, causing abnormal discharge of ink droplets. When the amount of the contained wetting agent is too large, viscosity of ink increases, exceeding the appropriate viscosity range.

—Penetrating Agent—

As the penetrating agent, water-soluble organic solvents such as polyol compounds and glycol ether compounds are used. Particularly, any one of polyol compounds having 8 or more carbon atoms and glycol ether compounds is preferably used.

When the number of carbon atoms in the polyol compound is less than 8, sufficient penetration ability cannot be obtained, recording medium is contaminated during printing on both sides, spread of ink on the recording medium is insufficient, and cover ratio of pixel is decreased. As a result, character quality or image density may be decreased.

Examples of polyol compounds having 8 or more carbon atoms include 2-ethyl-1,3-hexanediol (solubility 4.2% at 25° C.) and 2,2,4-trimethyl-1,3-pentanediol (solubility 2.0% at 25° C.). The glycol ether compounds are not particularly limited and may be appropriately selected according to the purpose. Examples thereof include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenyl ether and ethylene glycol monobenzyl ether.

The amount of the penetrating agent added to the ink is not particularly limited and may be appropriately selected according to the purpose. It is preferably 0.1% by mass to 20% by mass, and more preferably 0.5% by mass % to 10% by mass.

The amount of the water-soluble organic solvent added to the ink is preferably 0.1% by mass to 20% by mass, and more preferably 0.5% by mass to 10% by mass.

—Surfactant—

The surfactant is not particularly limited and may be appropriately selected according to the purpose. Examples of surfactants include anionic surfactants, nonionic surfactants, amphoteric surfactants, acetylene glycol surfactants, and fluorine surfactants.

Examples of anionic surfactants include polyoxyethylene alkyl ether acetate, dodecylbenzene sulfonate, salts of lauric acid, and polyoxyethylene alkyl ether sulfate salts.

Examples of nonionic surfactants include acetylene glycol surfactants, polyoxyethylene alkyl ethers, polyoxyethylene alkyl phenyl ethers, polyoxyethylene sorbitan fatty acid esters, polyoxypropylene polyoxyethylene alkyl ethers, polyoxyethylene alkyl esters, polyoxyethylene alkylamines, polyoxyethylene alkylamides.

Examples of acetylene glycol surfactants include 2,4,7,9-tetramethyl-5-decyne-4,7-diol, 3,6-dimethyl-4-octyne-3,6-diol, and 3,5-dimethyl-1-hexyne-3-ol. Examples of commercial products of the acetylene glycol surfactants include SURFYNOL 104, 82, 465, 485, TG, manufactured by Air Products and Chemicals Inc. (U.S.A.).

Examples of the amphoteric surfactants include laurylamino propionate, lauryl dimethyl betaine, stearyl dimethyl betaine, and lauryl dihydroxyethyl betaine. Specific examples thereof include lauryl dimethyl amine oxide, myristyl dimethyl amine oxide, stearyl dimethyl amine oxide, dihydroxyethyl lauryl amine oxide, polyoxyethylene palm oil alkyl dimethyl amine oxide, dimethyl alkyl (palm) betaine, and dimethyl lauryl betaine.

Of these surfactants, the surfactants represented by the following General Formulas (I), (II), (III), (IV), (V), and (VI) are preferred.

$$R^1-O-(CH_2CH_2O)_hCH_2COOM \qquad \text{General Formula (I)}$$

In General Formula (I), $R^1$ represents an alkyl group, and h represents an integer of 3 to 12; M represents any one selected from alkali metal ions, quaternary ammonium, quaternary phosphonium, and alkanolamines.

General Formula (II)

In General Formula (II), $R^2$ represents an alkyl group; M represents any one selected from alkali metal ions, quaternary ammonium, quaternary phosphonium, and alkanolamines.

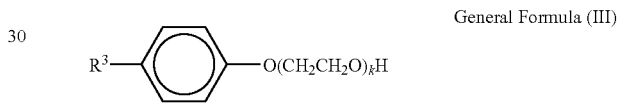

General Formula (III)

In General Formula (III), $R^3$ represents a hydrocarbon group; k represents an integer of 5 to 20.

$$R^4-(OCH_2CH_2)_jOH \qquad \text{General Formula (IV)}$$

In General Formula (IV), $R^4$ represents a hydrocarbon group; j represents an integer of 5 to 20.

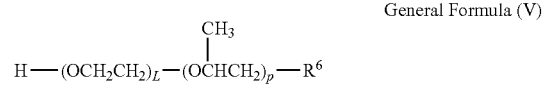

General Formula (V)

In General Formula (V), $R^6$ represents a hydrocarbon group; L and p respectively represent an integer of 1 to 20.

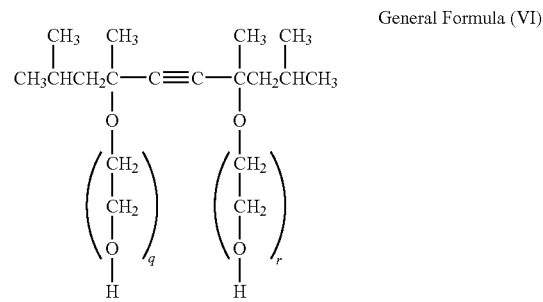

General Formula (VI)

In General Formula (VI), q and r respectively represent an integer of 0 to 40.

The surfactants represented by the above General Formulas (I) and (II) are specifically shown below in the form of free acids:

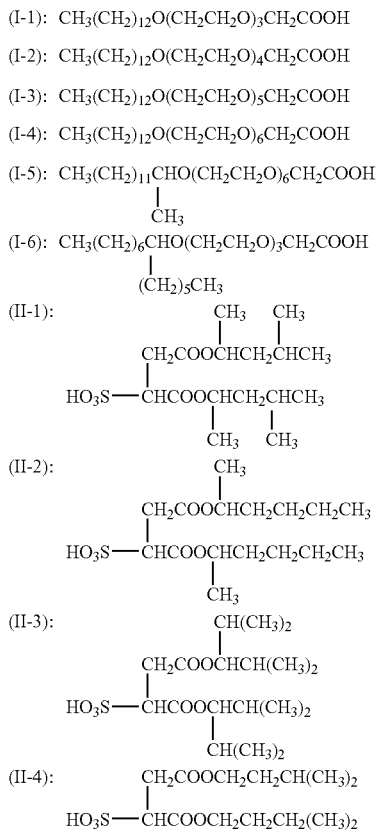

The preferred fluorine surfactants are represented by the following General Formula (II-5).

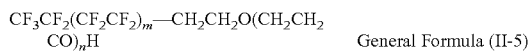
                                                                                             General Formula (II-5)

In General Formula (II-5), m represents an integer of 0 to 10; n represents an integer of 1 to 40.

Examples of fluorine surfactants include perfluoroalkyl sulfonic acid compounds, perfluoroalkyl carboxyl compounds, perfluoroalkyl phosphoric acid ester compounds, perfluoroalkyl ethylene oxide adducts and polyoxyalkylene ether polymer compounds having a perfluoroalkyl ether group in the side-chain. Of these, polyoxyalkylene ether polymer compounds having a perfluoroalkyl ether group in the side-chain are particularly preferred because of low foaming property and high safety as they have low bioaccumulation ability of fluorine compounds, which has recently been considered as a problem.

Examples of the perfluoroalkyl sulfonic acid compounds include perfluoroalkyl sulfonic acids and perfluoroalkyl sulfonates.

Examples of the perfluoroalkyl carboxyl compounds include perfluoroalkyl carboxylic acids and perfluoroalkyl carboxylates.

Examples of the perfluoroalkyl phosphoric acid ester compounds include perfluoroalkyl phosphoric acid esters and salts of perfluoroalkyl phosphoric acid esters.

Examples of the polyoxyalkylene ether polymer compounds having a perfluoroalkyl ether group in the side-chain include polyoxyalkylene ether polymers having a perfluoroalkyl ether group in the side-chain, sulfates of polyoxyalkylene ether polymer having a perfluoroalkyl ether group in the side-chain, and salts of polyoxyalkylene ether polymers having a perfluoroalkyl ether group in the side-chain.

Examples of counter ions of salts in the fluorine surfactants include Li, Na, K, $NH_4$, $NH_3CH_2CH_2OH$, $NH_2(CH_2CH_2OH)_2$, and $NH(CH_2CH_2OH)_3$.

As the fluorine surfactants, appropriately synthesized surfactants or commercially available products may be used.

Examples of commercially available products include SURFLON S-111, S-112, S-113, S-121, S-131, S-132, S-141, S-145 (manufacture by Asahi Glass Co., Ltd), FLORARD FC-93, FC-95, FC-98, FC-129, FC-135, FC-170C, FC-430, FC-431 (manufacture by Sumitomo 3M Limited), MEGAFAC F-470, F1405, and F-474 (manufacture by DIC Corporation), ZONYL TBS, FSP, FSA, FSN-100, FSN, FSO-100, FSO, FS-300, and UR (manufacture by DuPont), FT-110, FT-250, FT-251, FT-400S, FT-150, FT-400SW (manufacture by NEOS Company Limited), and PF-151N (manufacture by Omnova Solutions Inc.). Of these, ZONYL FS-300, FSN, FSN-100, and FSO (manufacture by DuPont) are particularly preferred in terms of being excellent in reliability and color developing improvement.

The fluorine surfactant has a surface tension at 25° C. is preferably 30 mN/m or less, more preferably 25 mN/m or less.

<Ink Fixing Agent>

As other conditions relating to the aqueous ink of the present invention, it is desirable that a resin component that enhances the fixation of the coloring particles be contained in the ink. The resin component that enhances the fixation is a component that maintains the bonding strength between the coloring particles and the medium surface or between the coloring particles above a predetermined level. Where such resin component is absent, the coloring particles are separated after printing. The fixing component may be contained independently in the ink or may be adsorbed and chemically bonded to the surface of coloring particles. A low-molecular or water-soluble resin may be used as the fixing agent, but a resin emulsion is preferred in terms of controlling ink viscosity.

As the fixing agent for coloring material, any resin emulsion can be used.

—Resin Emulsion—

In the resin emulsion, fine resin particles are dispersed in water as a continuous phase. The resin emulsion may include a dispersant such as a surfactant, as necessary.

As the dispersed phase, the amount of fine resin particles (amount of fine resin particles in the resin emulsion) is generally preferably 10% by mass to 70% by mass. Moreover, with consideration for the use in an inkjet recording apparatus, the fine resin particles have an average particle diameter of preferably 10 nm to 1,000 nm and more preferably 20 nm to 300 nm.

The fine resin particle component of the dispersed phase is not particularly limited and may be appropriately selected according to the purpose. Examples thereof include an acrylic resin, vinyl acetate resin, styrene resin, butadiene resin, styrene-butadiene resin, vinyl chloride resin, acryl-styrene resin, and acryl-silicone resin. Of these, acryl-silicone resin is particularly preferred.

As the resin emulsion, appropriately synthesized resin emulsions or commercially available products may be used.

Examples of commercially available products include Micro Gel E-1002 and E-5002 (styrene-acrylic resin emulsions manufactured by Nippon Paint Co., Ltd.), Bon Coat 4001 (acrylic resin emulsion manufactured by DIC Corporation), Bon Coat 5454 (styrene-acrylic resin emulsion manufactured by DIC Corporation), SAE-1014 (styrene-acrylic resin emulsion manufactured by Zeon Corporation), Saivinol SK-200 (acrylic resin emulsion manufactured by Saiden Chemical Industry Co., Ltd.), Primal AC-22 and AC-61 (acrylic resin emulsions manufactured by Rohm and Haas Co., Ltd.), Nanocryl SBCX 2821 and 3689 (acrylic silicone resin emulsions manufactured by Toyo Ink Mfg. Co. Ltd.), and #3070 (methyl methacrylate copolymer resin emulsion manufactured by Mikuni Color Ltd.).

It is preferred that the amount of fine resin particles of the resin emulsion that is added to the ink be 0.1% by mass to 50% by mass, more preferably 0.5% by mass to 20% by mass, and still more preferably 1% by mass to 10% by mass. When the amount of fine resin particles is less than 0.1% by mass, a sufficient effect cannot be obtained in preventing clogging and improving discharge stability, and when the amount is more than 50% by mass, it may decrease the storage stability of the ink.

—Other Components—

Other components are not particularly limited and may be appropriately selected according to the purpose. Examples thereof include pH adjusting agents, antiseptic/antifungal agents, antirust agents, antioxidants, UV absorbers, oxygen absorbers, and photostabilizers.

Examples of antiseptic/antifungal agents include 1,2-benzisothiazolin-3-one, sodium dehydroacetate, sodium sorbate, 2-pyridinethiol-1-oxide sodium, sodium benzoate, and pentachlorophenol sodium.

The pH adjusting agents are not particularly limited and any substance can be used according to the purpose, as long as it can adjust pH to 7 or more, without adversely affecting the ink to be prepared.

Examples of suitable pH adjusting agents include amines such as diethanolamine and triethanolamine, alkali metal hydroxides such as lithium hydroxide, sodium hydroxide, and potassium hydroxide, ammonium hydroxide, quaternary ammonium hydroxide, quaternary phosphonium hydroxide; and alkali metal carbonates such as lithium carbonate, sodium carbonate, and potassium carbonate.

Examples of antirust agents include acidic sulfite, sodium thiosulfate, ammonium thiodiglycolate, diisopropyl ammonium nitrate, pentaerythritol tetranitrate, and dicyclohexylammonium nitrate.

Examples of antioxidants include phenol antioxidants (including hindered phenol antioxidants), amine antioxidants, sulfur antioxidants, and phosphorus antioxidants.

Examples of the phenol antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetraxis[methylene-3-(3',5'-di-tert-butyl-4'-hydroxyphenyl)propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetraxis[methylene-3-(3,5-di-tert-butyl-4-dihydroxyphenyl)propionate]methane, 1,1,3-tris(2-methyl-4-hydroxy-5-tert-butylphenyl)butane.

Examples of the sulfur antioxidants include dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzimidazole, and dilauryl sulfite.

Examples of the phosphorous antioxidants include triphenyl phosphite, octadecyl phosphite, triisodecyl phosphite, trilauryl trithiophosphite, and trinonylphenyl phosphite.

Examples of the UV absorbers include benzophenone ultraviolet ray absorbers, benzotriazole ultraviolet ray absorbers, salicylate ultraviolet ray absorbers, cyanoacrylate ultraviolet ray absorbers, and nickel complex salt ultraviolet ray absorbers.

Examples of the benzophenone ultraviolet ray absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole ultraviolet ray absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet ray absorbers include phenyl salicylate, p-tert-butylphenyl salicylate, and p-octylphenyl salicylate.

Examples of the cyanoacrylate ultraviolet ray absorbers include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Examples of the ultraviolet ray absorbers of nickel complex salts include nickel bis(octylphenyl) sulfide, 2,2'-thiobis(4-tert-octylphelate)-n-butylamine nickel (II), 2,2'-thiobis(4-tert-octylphelate)-2-ethylhexylamine nickel (II) and 2,2'-thiobis(4-tert-octylphelate) triethanolamine nickel (II).

[Preparation of Ink]

The ink of the present invention contains at least water, a colorant, a water soluble organic solvent, a wetting agent and a surfactant, and further contains other components, as necessary. These components are dispersed or dissolved in an aqueous solvent, and further stirred and mixed as necessary, so as to produce the ink of the present invention. The dispersing may be performed with a sand mill, a homogenizer, a ball mill, a paint shaker, or an ultrasonic dispersing machine, and the stirring and mixing may be performed by using a stirring machine using a typical blade, a magnetic stirrer, or a high-speed dispersing machine.

Physical properties of the ink such as viscosity, surface tension, and pH are preferably within the following ranges.

Viscosity of the ink at a temperature of 25° C. is preferably 1 cps to 30 cps, and more preferably 2 cps to 20 cps. When the viscosity is higher than 20 cps, discharge stability may be difficult to be ensured.

The pH is preferably 7 to 10, for example.

[Amount of Ink Adhesion]

In accordance with the present invention, in order to prevent the coloring material contained in the ink from excessively penetrating, to localize it efficiently near the medium surface, and to ensure ink drying property, it is necessary to limit severely the total amount of ink. The total amount of ink is an important parameter when an image is formed and represents the amount of ink per unit surface area where a solid image of a highest density is formed. In accordance with the present invention, by regulating the total amount of ink it is possible to form a uniform image having less beading or bleeding even on media having poor ink absorption ability. Conversely, when the ink is used in an amount above this limit, that is, as in the conventional inkjet recording process a large amount of ink is used, the coloring material separation ability of the coat layer is not followed, the coloring pigment of the ink penetrates media together with the ink solvent to the back surface, causing strike through, and the penetration of the solvent component of the ink greatly hinders the image formation process. As a result, a high-quality image cannot be obtained.

More specifically, when the ink of the present invention is used, the maximum amount of ink adhesion during image formation (regulated value of the total amount of ink) is preferably 20 g/m$^2$, and when an image is formed with the amount of ink adhesion that is equal to or less than this value, the image of very high quality that is free from beading and bleeding can be obtained. It has been found that amount of ink adhesion of 16 g/m$^2$ or less is even more preferred.

This can be explained as follows. By contrast with the conventional combinations of dye inks and media specialized for inkjet printing, in the case of the pigment ink and medium of the present invention, the coloring material is present in the form of a deposit on the medium surface, and when the coloring material is used in an amount necessary to cover the medium surface, the coloring material in excess of this amount is wasted. Moreover, even when the high-penetration ink of the present invention is used, the extra ink solvent interferes with the adjacent dots, causing beading and bleeding.

In particular, in the case where the regulated value of the total amount of ink is set high, as in the conventional inkjet recording, even if the ink of the present invention is used, a large amount of ink is used in solid portions and shadow portion, the coloring material separation ability of the medium is exceeded, causing the image bleeding and greatly decrease of the drying property.

The total amount of ink to be used for image formation in the present invention can be made sufficiently small by comparison with that of the conventional inkjet printing method, even when a high image density is required, and by contrast with the conventional inkjet media, when the ink absorption ability of the medium itself is low, the coloring material easily spreads uniformly over the medium surface. In other words, because the ink is spread thinly over the medium surface, even if the ink absorption ability is low, the ink can be dried and the bleeding and beading rarely occur.

Further, the penetration of carrier can be easily adjusted by the amount of penetrating agent (EHD) and also the amount of fluorine surfactant FS300.

Furthermore, by decreasing the total amount of ink necessary for printing, the capacity of the ink cartridge can be reduced by comparison with that of the conventional ink cartridge, and thus the device can be reduced in size. Where the cartridge size is the same as in the conventional systems, the replacement frequency of the ink cartridge can be reduced and printing can be performed at a lower cost.

Basically, the smaller the total amount of ink is, the better pigment separation ability of the coat layer is exhibited, but when the total amount of ink is too small, a side effect is produced, that is, the image dot diameters after printing become too small. Therefore, it is desirable that the total amount of ink be set (regulated) within this range according to a desired image.

<Regulating the Total Amount>

A processing of "regulating the total amount" will be described below.

The processing of regulating the total amount is performed as shown in FIG. 12. The regulated value of the total amount as shown herein is the amount of ink droplets found from the results of evaluation performed to prevent the effects causing when amount of ink adhesion is excessively large, for example, ink beading, rubbing or transfer caused by decrease in cockling resistance, and clogging of the paper.

The regulation specification of the regulated value of the total amount can be represented, for example, in a 600×600 dpi, 100×100 mask size (units: pL).

The inventors of the present invention has been conducted tests and found that the amount of drops of the same order as the regulated value of the total amount in the plain paper and about 55% the regulated value of the total amount in a silky glossy paper is suitable as a regulated value of the total amount in the case printing in accordance with the invention is performed on the recording medium. Further, there are cases in which the amount of drops obtained from the input values is larger than the regulated value of the total amount, as an object to which the processing of regulating the total amount is actually applied, and in such cases, the processing of suppressing the amount of drops to a level equal to or less than the regulated value of the total amount is performed by decreasing the amount of ink drops of CMY colors, while maintaining the amount of drops of Bk ink. The disposition order of the unit for regulating the total amount and the γ table can be reversed. In the present invention, the total amount of ink is measured by a weight method. More specifically, a rectangular solid image of 5 cm×20 cm is printed at a maximum concentration, on Super Fine Paper (manufactured by SEIKO EPSON CORPORATION) that is a special paper for inkjet printing, the weight is measured immediately after the printing, the weight before the printing was subtracted therefor, and the value obtained was multiplied by 100 to obtain the total amount of ink.

<Printer>

The ink of the present invention in the ink media set can be advantageously used in printers using the following inkjet heads: a so-called piezo-type inkjet head in which a piezoelectric element is used as a pressure generating unit that pressurizes ink located in an ink channel to deform an oscillation plate forming a wall surface of the ink channel, and the internal volume of the ink channel is changed thereby discharging an ink droplet (see Japanese Patent Application Laid-Open (JP-A) No. 02-51734), a so-called thermal-type inkjet head that uses a heat-generating resistor to heat the ink in an ink channel and generate gas bubbles (see JP-A No. 61-59911), and an electrostatic inkjet head in which an oscillation plate forming a wall surface of an ink channel is disposed opposite an electrode and the oscillation plate is deformed by electrostatic forces generated between the oscillation plate and the electrode so as to change the internal volume of the ink channel, thereby discharging an ink droplet (see JP-A No. 06-71882).

<Ink Cartridge>

In an ink cartridge used in the present invention, the ink of the present invention in the ink media set is contained in a container. The ink cartridge may have appropriately selected other components, as necessary. The container is not particularly limited, and the shape, structure, size and material thereof may be appropriately selected according to the purpose. For example, the container having at least an ink bag formed from an aluminum laminated film, a resin film, or the like is preferred.

The ink cartridge will be explained below with reference to FIGS. 1 and 2. Here, FIG. 1 shows an example of an ink cartridge used in the present invention, and FIG. 2 also shows an ink cartridge shown in FIG. 1, which includes a case (housing).

Figure 2:
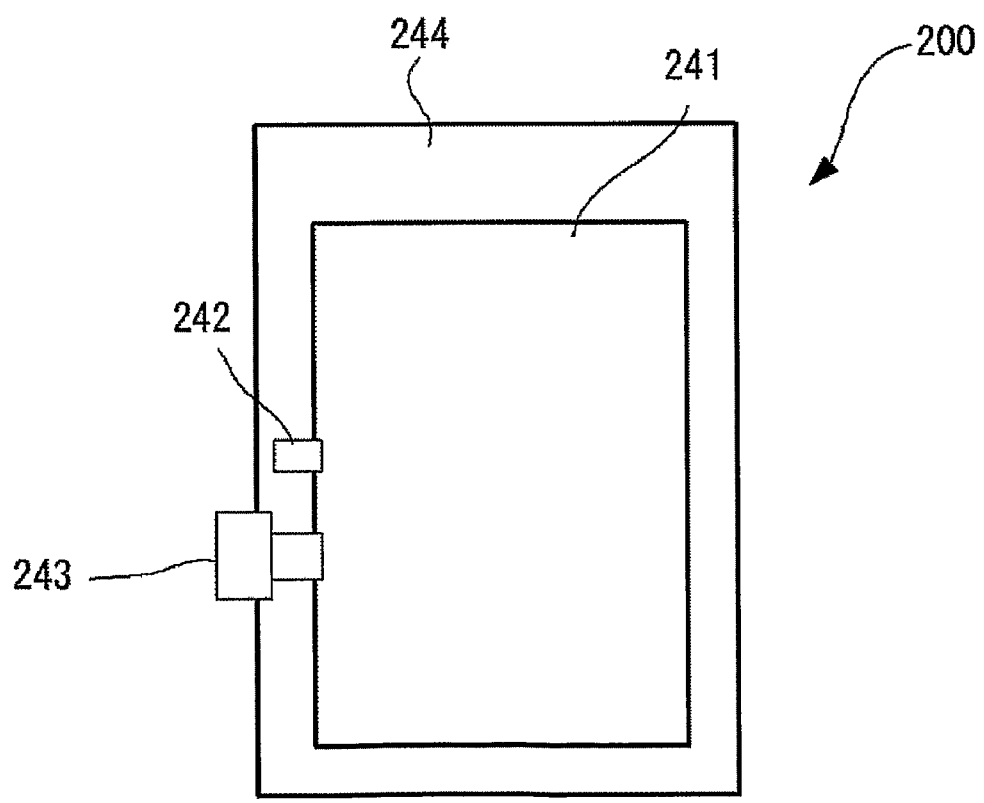
FIG. 2 shows a schematic view of an example of an ink cartridge including a case (housing) shown in FIG. 1.

As shown in FIG. 1, in the ink cartridge 200, from an ink charging port 242 an ink bag 241 is filled with an ink and air is removed, and then the ink charging port 242 is closed by fusion bonding. When the ink cartridge is used, an ink discharge port 243 made from a rubber member is pierced with a needle of the apparatus body and the ink is supplied into the apparatus.

The ink bag 241 is formed from a packaging material such as an aluminum laminated film having no air permeability. As shown in FIG. 2, the ink bag 241 is usually contained in a plastic cartridge case (housing) 244 and can be used by detachably mounting on inkjet recording apparatuses of various kinds.

The ink cartridge used in the present invention contains the inkjet ink in the ink media set and can be used by detachably mounting on inkjet recording apparatuses of various kinds. It can be particularly advantageously used by detachably mounting on the inkjet recording apparatus of the present invention which will be described below.

<Inkjet Recording Method and Inkjet Recording Apparatus>

The inkjet recording apparatus of the present invention contains at least an inkjetting unit, and further includes other units suitably selected as necessary, such as a stimulus generating unit and a controlling unit.

The inkjet recording method of the present invention includes at least an inkjetting step, and further includes other steps suitably selected as necessary, such as a stimulus generating step and a controlling step.

The inkjet recording method of the present invention can be suitably performed by the inkjet recording apparatus of the present invention, and the inkjetting step can be suitably performed by the inkjetting unit. Also, other steps can be suitably performed by other units.

<Inkjetting Step and Inkjetting Unit>

The inkjetting step is a step of jetting the ink of the present invention in the ink media set by applying a stimulus to the ink so as to record an image on a recording medium.

The inkjetting unit is a unit configured to jet the ink in the ink media set by applying a stimulus to the ink so as to record an image on a recording medium in the ink media set. The inkjetting unit is not particularly limited, and examples thereof include various nozzled for discharging the ink.

In accordance with the present invention, it is preferred that at least some members from among a liquid chamber, a fluid resistance portion, an oscillating plate, and a nozzle member of the ink jet head be formed from a material containing at least any of silicon and nickel.

The nozzle diameter of the ink jet nozzle is preferably 30 µm or less, and more preferably 1 µm to 20 µm.

Further, a configuration is preferred in which a sub-tank for supplying ink is provided above the inkjet head and the ink in the sub-tank be replenished via a supply tube from the ink cartridge.

Further, in the inkjet recording method of the present invention, the maximum amount of ink adhesion is preferably 8 g/m$^2$ to 20 g/m$^2$ at a resolution of 300 dpi or higher.

The stimulus can be generated, for example, by the stimulus generating unit, and the stimulus is not particularly limited and may be suitably selected according to the purpose. Examples thereof include heat, pressure, vibration and light. These may be used alone or in combination. Of these, heat and pressure are preferable.

Examples of the stimulus generating units include heaters, pressurizers, piezoelectric elements, vibration generators, ultrasonic oscillators and lights. Specific examples thereof include a piezoelectric actuator such as a piezoelectric element, a thermal actuator that utilizes phase transition caused by film boiling of a liquid by using a thermoelectric conversion element such as an exothermic resistive element, a shape-memory-alloy actuator that utilizes metal phase transition caused by temperature variations, and an electrostatic actuator using electrostatic force.

The aspect of the jetting of the inkjet ink in the ink media set is not particularly limited and varies according to the kinds of the stimulus or the like. In the case where the stimulus is "heat", there is, for example, a method in which thermal energy corresponding to a recording signal is applied to the inkjet ink in a recording head, using a thermal head or the like, bubbles are generated in the ink by the thermal energy, and the ink is discharged as droplets from nozzle holes of the recording head by the pressure of the bubbles. Meanwhile, in the case where the stimulus is "pressure", there is, for example, a method in which by applying voltage to a piezoelectric element bonded to a site called a pressure chamber that lies in an ink channel in a recording head, the piezoelectric element bends, the volume of the pressure chamber decreases, and thus the inkjet ink is discharged as droplets from nozzle holes of the recording head.

It is desirable that the ink droplets jetted be, for example, 1 pL to 40 pL in size, 5 m/s to 20 m/s in discharge velocity, 1 kHz or greater in drive frequency and 300 dpi or greater in resolution.

The controlling unit is not particularly limited and may be suitably selected according to the purpose, as long as it can control operations of the aforementioned units. Examples thereof include apparatuses such as a sequencer and a computer.

[Inkjet Recording Apparatus]

One embodiment of inkjet recording method of the present invention using the inkjet recording apparatus of the present invention will be described below with reference to the drawings. An inkjet recording apparatus shown in FIG. 3 contains an apparatus body 101, a paper feed tray 102 which serves to load paper and is mounted on the apparatus body 101, a paper discharge tray 103 which serves for stocking papers on which images have been recorded (formed) and is mounted on the apparatus body 101, and ink cartridge loading unit 104.

A control panel 105 containing control keys and a display is disposed on the upper surface of the ink cartridge loading unit 104. The ink cartridge loading unit 104 has a front cover 115 that can open and close for detachably mounting an ink cartridge 200.

Figure 3:
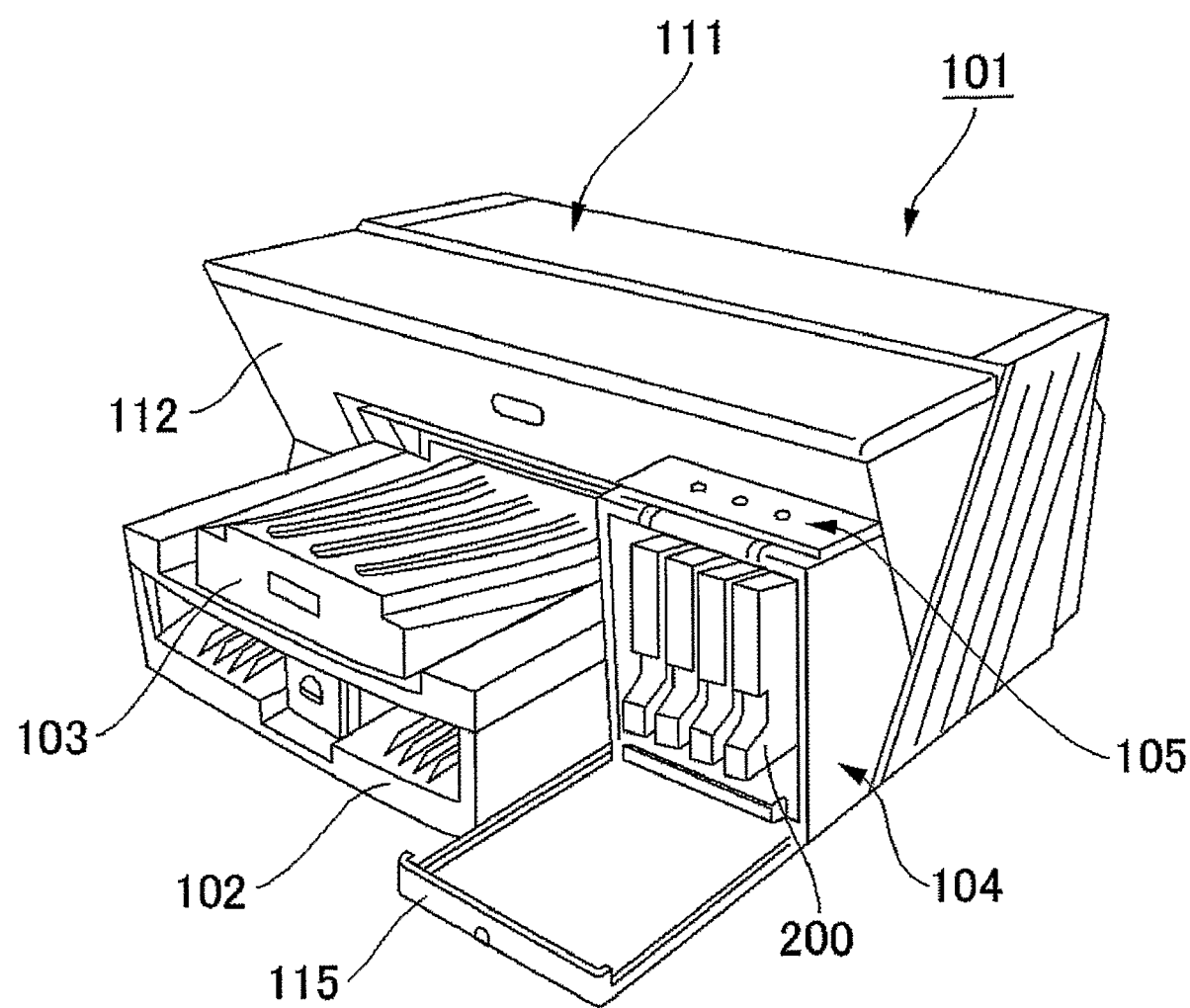
FIG. 3 shows a perspective explanatory view of an example of an ink cartridge loading unit in an inkjet recording apparatus in a state where a cover of the ink cartridge loading unit is open.
Figure 4:
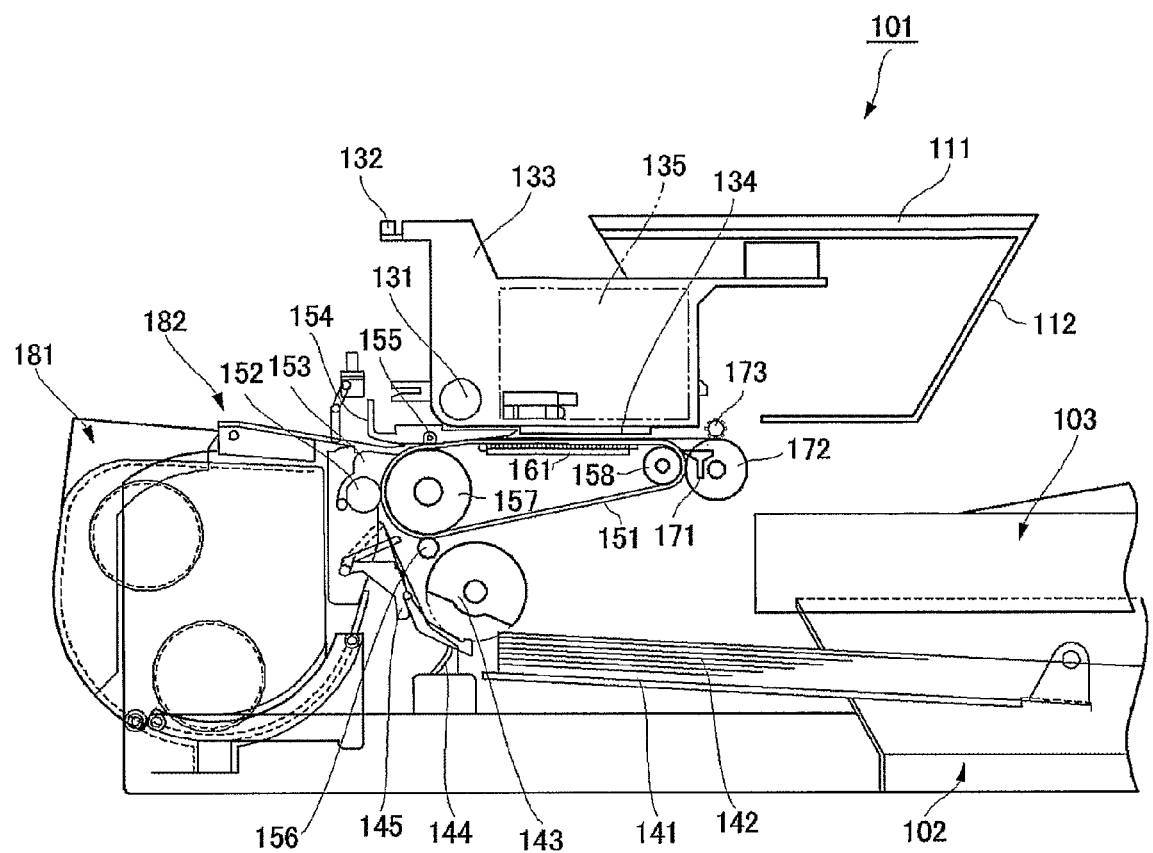
FIG. 4 shows a schematic view of an example of an entire configuration of an inkjet recording apparatus.

In FIGS. 3 and 4, 111 denotes an upper cover, and 112 denotes a front surface.

Figure 5:
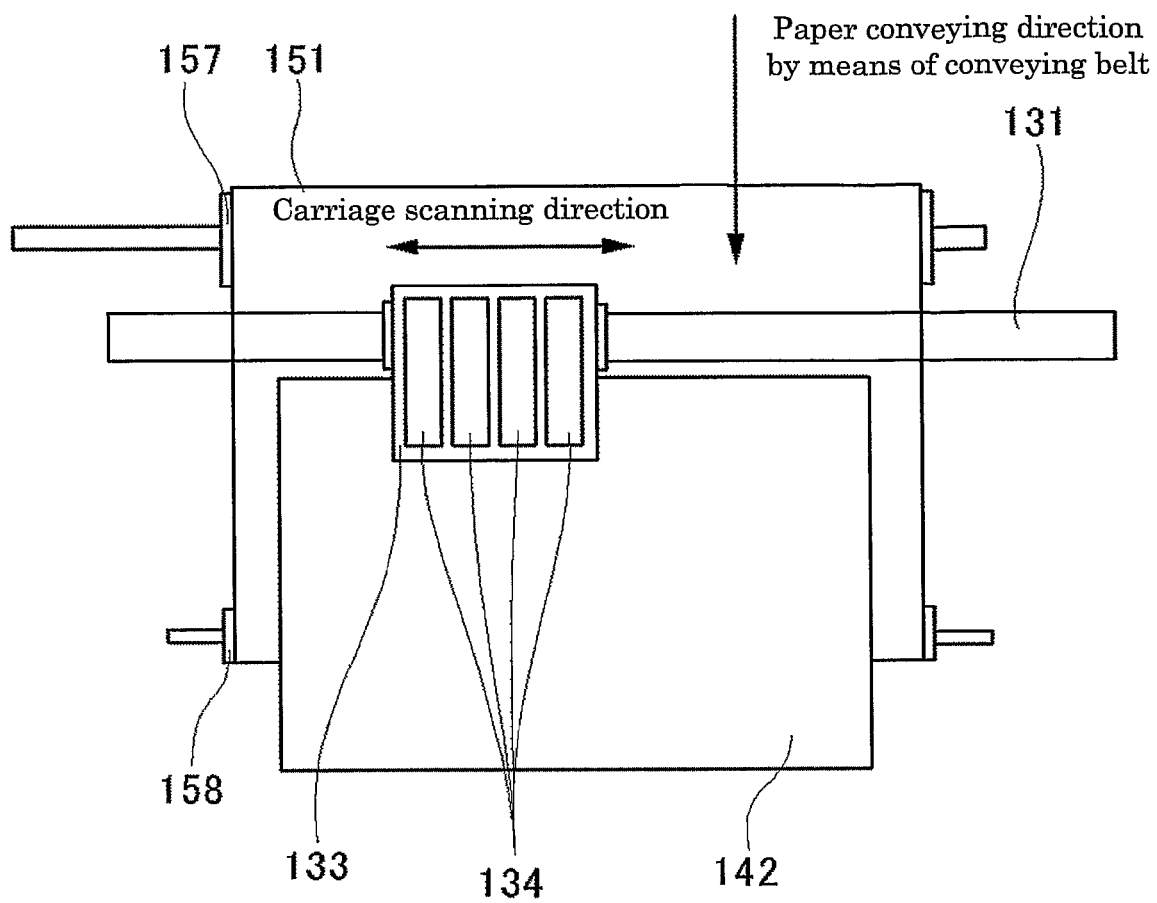
FIG. 5 shows a schematic enlarged view of an example of an inkjet head used in the present invention.

Inside the apparatus body 101, as shown in FIGS. 4 and 5, a carriage 133 is supported so that it can slide in the main scanning direction by a guide rod 131 and a stay 132 that are guide members extending in the transverse direction between left and right side plates (not shown), and the cartridge can be moved for scanning in the direction shown by an arrow in FIG. 5 by a main scanning motor (not shown).

In the carriage 133, recording heads 134 composed of four inkjet recording heads respectively discharging ink droplets of colors of yellow (Y), cyan (C), magenta (M), and black (Bk) is equipped so that a plurality of ink discharge ports are arranged in the direction perpendicular to the main scanning direction and the ink droplet discharge directions face downward.

An inkjet recording head constituting the recording head 134, which contains a piezoelectric actuator such as a piezoelectric element, a thermal actuator that utilizes phase transition caused by film boiling of a liquid by using a thermoelectric conversion element such as an exothermic resistive element, a shape-memory-alloy actuator that utilizes metal phase transition caused by temperature variations, or an electrostatic actuator using electrostatic forces as an energy generating unit for discharging ink, can be used.

The carriage 133 carries sub-tanks 135 for supplying with inks of each color to the recording head 134. The sub-tank 135 is supplied with the ink of the present invention in the ink media set via an ink supply tube (not shown) from the ink cartridge 200 that is loaded into the ink cartridge loading unit 104.

On the other hand, a half-moon roller (paper feed roller) 143 that can feed paper 142 sheet by sheet from a paper loading unit (pressure plate) 141 and a separation pad 144 facing the paper feed roller 143 and made from a material with a high friction coefficient are provided as a paper feed unit for feeding paper 142 that was loaded on the paper loading unit (pressure plate) 141 of the paper feed tray 102, and the separation pad 144 is biased toward the paper feed roller 143.

A conveying belt 151 for electrostatically attracting the paper 142 and conveying it, a counter roller 152 for conveying the paper 142 conveyed from the paper feed unit via a guide 145 between the counter roller and the conveying belt 151, a conveying guide 153 that converts the direction of the paper 142 that is fed substantially vertically upward by substantially 90° to align the paper with the conveying belt 151, and a tip pressurization roller 155 that is biased toward the conveying belt 151 with a pushing member 154 are provided as a conveying unit for conveying the paper 142 fed from the paper feed unit below the recording head 134. A charging roller 156 is provided as a charging unit for charging the surface of the conveying belt 151.

The conveying belt 151 is an endless belt that is stretched between a conveying roller 157 and a tension roller 158 and can rotate in the belt conveying direction. The conveying belt 151, for example, has a surface layer serving as a paper attraction surface that is formed from a resin material having a thickness of about 40 µm, which resistance is not controlled, for example, a surface layer consisting of tetrafluoroethylene-ethylene copolymer (ETFE) and a back layer (medium resistance layer, ground layer) that is made from the same material as the surface layer, which resistance is controlled by carbon. A guide member 161 is disposed opposite a printing region created by the recording head 134 on the rear side of the conveying belt 151. A separation hook 171 for separating the paper 142 from the conveying belt 151, a paper discharge roller 172, and a paper discharge roller 173 are provided as a paper discharge unit for discharging the paper 142 that has been recorded in the recording head 134. The paper discharge tray 103 is arranged below the paper discharge roller 172.

A double face paper feeding unit 181 is detachably attached to the back surface of the apparatus body 101. The double face paper feeding unit 181 captures the paper 142 returned by a reverse rotation of the conveying belt 151 to reverse the paper 142, thereby feeding the sheets again between the counter roller 152 and the conveying belt 151. It is noted that a manual paper feeding portion 182 is provided on the upper face of the double face paper feeding unit 181.

In this inkjet recording apparatus, the paper 142 is separated and fed from the paper feed part one by one. Being fed vertically, the paper 142 is guided by the guide 145 and conveyed between the conveying belt 151 and the counter roller 152. Then, it is guided by the conveying guide 153 at the leading end and is pressed against the conveying belt 151 by the leading end pressure roller 155 to change the convey direction substantially by 90°.

Meanwhile, the conveying belt 151 is charged by the charging roller 156, and the paper 142 is electrostatically adsorbed and conveyed by the conveying belt 151. Then, the recording heads 134 are driven according to image signals while the carriage 133 is moved. Ink droplets are discharged on the paused paper 142 for recording one-line. Then, the paper 142 is conveyed by a certain rate for recording the next line. Receiving a recording end signal or a signal indicating the rear end of the paper 142 has reached the recording area, the recording operation is terminated and the paper 142 is discharged to the paper output tray 103.

Then, when ink inside the sub-tank 135 is detected for the near end of residual amount, the ink is refilled at a predetermined amount from the ink cartridge 200 to the sub-tank 135.

In the inkjet recording apparatus, a housing of the ink cartridge 200 can be disassembled to exchange only an ink bag thereinside when recording ink inside the ink cartridge 200 is used up. Further, the ink cartridge 200 is able to supply the recording ink stably, even when constituted so as to fill the ink vertically from the front face. Therefore, when the ink cartridge is arranged, with the apparatus body 101 being closed above, for example, a case where the ink cartridge is contained inside a rack or an object is placed on the upper face of the apparatus body 101, the ink cartridge 200 can be exchanged easily.

In this instance, an explanation is made by referring to an example applied to a serial type (shuttle-type) inkjet recording apparatus at which the carriage scans. The inkjet recording apparatus is also applicable to a line-type inkjet recording apparatus equipped with a line-type head.

The inkjet recording apparatus and the inkjet recording method of the present invention are applicable to various types of recording by an inkjet recording method, and in particular advantageously applicable, for example, to printers, facsimile devices, copiers, and printer/fax/copier multi-purpose machines for inkjet recording.

<Explanation of Relationship between Nozzle Plate, Ink and Medium>

An inkjet head, ink, and medium used in the present invention will be described below.

When an ink is used that has a comparatively low surface tension, such as the ink used in the image forming method of the present invention, it is preferred that the nozzle plate excel in water repellency and ink repellency. This is because by using the nozzle plate that excels in water repellency and ink repellency, it is possible to form normally a meniscus even of the ink with a low surface tension, thereby enabling effective formation of ink droplets. When the meniscus is normally formed, the ink is prevented from stretching unidirectionally during spraying. As a result, the ink spraying trajectory is hardly curved and an image having an accurate dot position can be obtained.

Further, when printing is performed on a medium with low absorption ability, as the medium (paper) used in the ink media set, the image quality strongly depends on the accuracy of dot position. In other words, because the ink spreads poorly on the medium having low absorption ability, when the accuracy of dot position decreases slightly, areas in which the ink fails to fill, that is, white spots appear on the medium. These areas cause uneven image density and decrease of image density, thereby causing poor image quality.

However, the inkjet head used in the present invention can realize high accuracy of a dot position even if ink having low surface tension is used, by which the ink successfully fills a recording medium having low absorption, thereby obtaining a print having high image quality free of uneven image density or poor image density.

<Ink Repellent Layer>
(Surface Roughness)

The surface roughness Ra of the ink repellent layer is preferably 0.2 µm or less. By making the surface roughness Ra of 0.2 µm or less, it is possible to reduce the amount of wiping residues during wiping.

FIGS. 6, 7A to 7C and 8A to 8C are cross-sectional views of the nozzle plate of the inkjet head used in the present invention.

Figure 6:
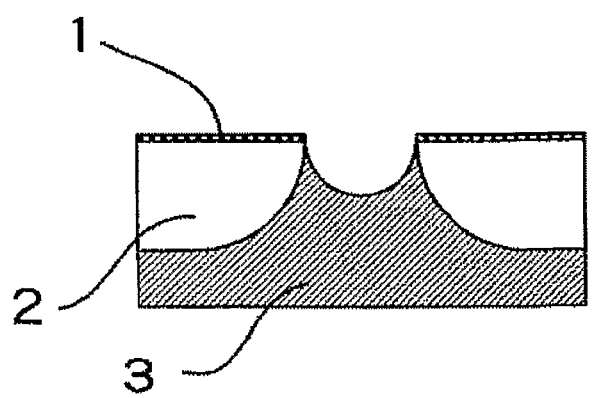
FIG. 6 shows a cross-sectional view of an example of a nozzle plate of an inkjet head used in the present invention.

FIG. 6 shows a cross-sectional view of an example of a nozzle plate of the inkjet head used in the present invention.

In the present embodiment, a nozzle plate 2 which is a base material of the inkjet head produced by Ni electroforming, an ink repellent layer 1 is formed on the base material, wherein the ink repellent layer 1 is a silicone resin film having a thickness of 0.1 µm or more and preferably has a surface roughness (Ra) of 0.2 µm or less. The ink repellent layer 1 preferably has a thickness of 0.5 µm or more.

Figure 7A:
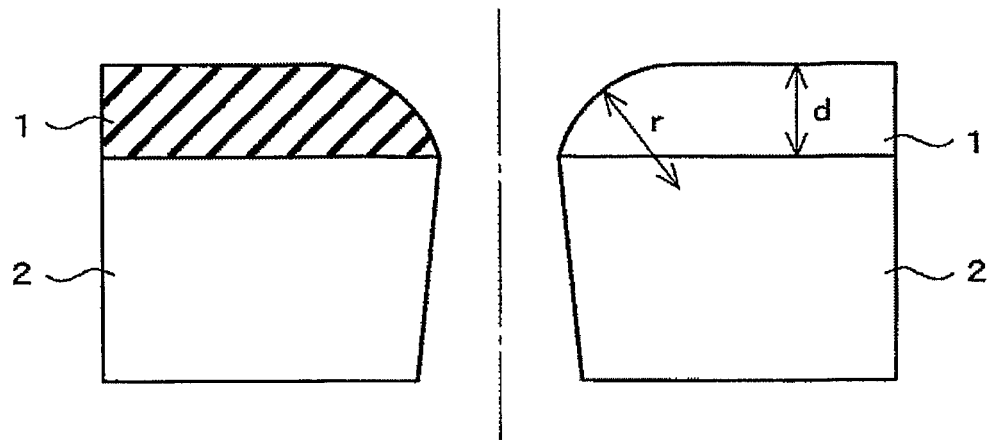
FIG. 7A shows another cross-sectional view of an example of a nozzle plate of the inkjet head used in the present invention (first).
Figure 7B:
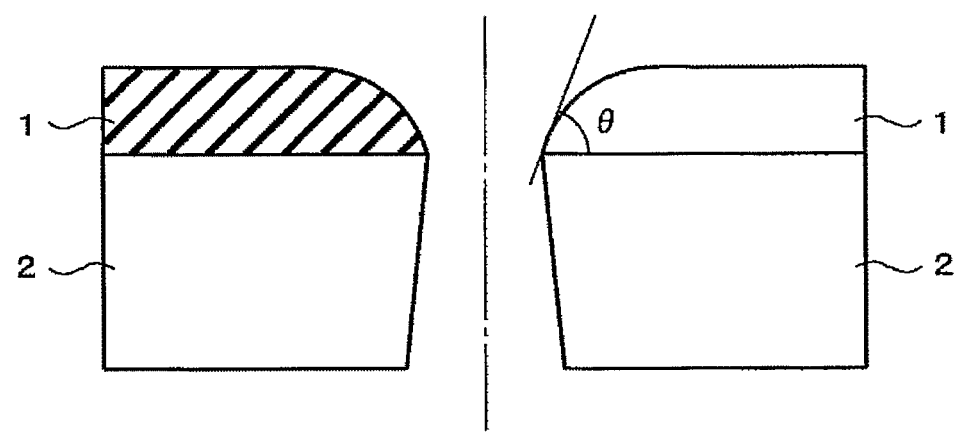
FIG. 7B shows another cross-sectional view of an example of a nozzle plate of the inkjet head used in the present invention (second).
Figure 7C:
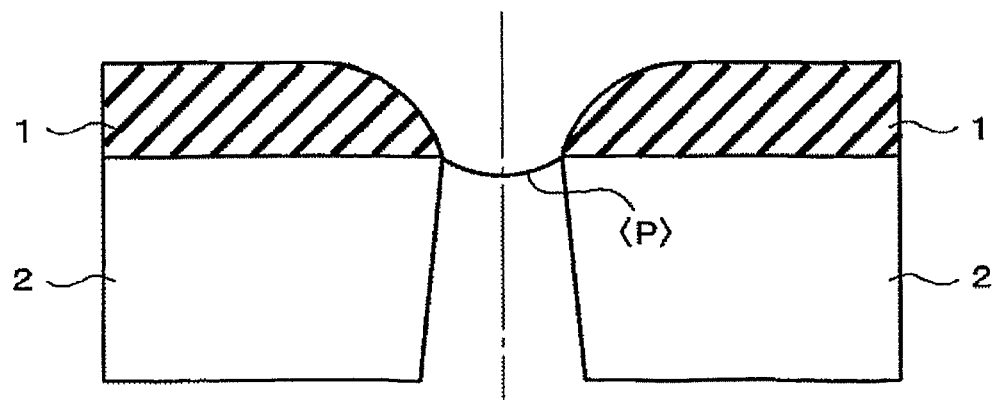
FIG. 7C shows another cross-sectional view of an example of a nozzle plate of the inkjet head used in the present invention (third).

During filling with an ink 3, as shown in FIG. 7C, a meniscus (liquid surface) P is formed in a boundary portion of the ink repellent layer 1 composed of a silicon resin film and the nozzle plate 2.

A liquid silicone resin curable at room temperature is preferably used as the silicone resin used in the present embodiment and a resin of a type such that curing is accompanied by a hydrolysis reaction is even more preferred. In the below-described examples, SR2411 (manufactured by Dow Corning Toray Co., Ltd.) is used.

Table 1 below shows the results obtained by evaluating the shape of the ink repellent layer 1 from the opening edge of the nozzle plate 2 to the vicinity of the opening edge in the inkjet head of the present embodiment and the occurrence of ink residue around the nozzle, edge separation, and discharge stability.

TABLE 1

| Edge shape | | Ink residue | Edge separation | Discharge stability |
|---|---|---|---|---|
| Sharp tip is present | | Some ink residue occur | Occurs | Good |
| No sharp tip (round shape) | θ ≦ 90° | None | None | Good |
| | θ > 90° | None | None | Poor |
| | r ≧ d | None | None | Good |
| | r < d | None | Some edge separation occur | Poor |

Next, an inkjet head according to the present invention will be explained.

During filling with an ink 3, as shown in FIG. 7C, a meniscus (liquid surface) P is formed in a boundary portion of the ink repellent layer 1 composed of a silicon resin film and the nozzle plate 2.

The ink repellent layer is so formed that a cross section area in a plane perpendicular to a central line of an opening of the ink repellant layer that is formed on the surface provided with openings (nozzles) for ink discharge in the inkjet head in the vicinity of the openings increases successively with distance from the surface of the base material.

The ink repellent layer preferably has a curved surface shape in the vicinity of the opening.

Further, the curvature radius of the curve of the ink repellent layer in the vicinity of the opening in the cross section of the plane including the central line of the opening is preferably equal to or more than the thickness of the ink repellent layer.

Further, it is also preferred that the curve of the ink repellent layer from the edge of the opening to the vicinity of the opening in the cross section of the plane including the central line of the opening be a substantially circular-arc curve, and the curvature radius of the circular arc is preferably equal to or more than the thickness of the ink repellent layer.

A tangent line to the ink repellent layer passing through the edge of the opening in the cross section of the plane including the central line of the opening preferably forms an angle of less than 90° with the nozzle member surface including the edge.

The opening of the nozzle plate 2 is so provided that the cross section formed by the plane perpendicular to the central line represented by a dot-dash line in FIGS. 7A to 7C has a substantially round shape with this central line as a center. Further, the ink repellent layer 1 formed on the ink discharge surface in the nozzle plate 2 is formed such that the cross section area of the opening portion formed by the plane perpendicular to the central line increases successively with distance from the nozzle plate 2.

More specifically, as shown in FIG. 7A, in the open portion of the ink repellent layer 1, the curve from the opening edge of the nozzle plate 2 in the vicinity of the opening has a round shape with a curvature radius "r". This curvature radius "r" is preferably equal to or more than the thickness "d" of the ink repellent layer 1 outside the zone in the vicinity of the open portion.

The thickness "d" is a thickness of ink repellent layer 1 outside the round portion that is the open portion and preferably is the maximum thickness of the ink repellent layer.

Thus, the open portion of the ink repellent layer 1 that is connected to the opening of the nozzle plate 2 has a shape without sharp edges (smooth curve without sharp portions) and is a curve having no protruding zones. Therefore, when it is wiped with a wiper formed from a material such as rubber, the ink repellent layer 1 can be prevented from being separated from the nozzle plate 2 as a result of sharp portions being caught by the wiper.

Further, as shown in FIG. 7B a tangent line to the ink repellent layer 1 passing through the edge of the opening in the cross section along the plane including the central line of the opening of the nozzle plate 2 preferably forms an angle θ of less than 90 degrees with the surface of the nozzle plate 2 including the opening edge of the nozzle plate 2 connected to the edge of the opening portion.

When the angle θ between the tangent line to the ink repellent layer 1 at the edge of the opening portion and the surface of the nozzle plate 2 is less than 90 degrees, as shown in FIG. 7C, a meniscus (liquid surface) P is formed with good stability in the boundary portion of the ink repellent layer 1 and the nozzle plate 2, and the possibility of the meniscus P being formed in the portion can be greatly reduced.

As a result, because the meniscus formation surface is stabilized, ink discharge stability during image formation in the image forming apparatus using the inkjet head including the nozzle plate 2 can be improved.

A liquid silicone resin curable at room temperature is preferably used as the silicone resin used in the present embodiment and a resin of a type such that curing is accompanied by a hydrolysis reaction is even more preferred. In the below-described examples, SR2411 (manufactured by Dow Corning Toray Co., Ltd.) is used.

In the case where a substantially sharp tip is contained in the edge portion (in the vicinity of the opening portion edge)

of the ink repellent layer 1, ink residue is observed around the nozzle and edge separation occurs due to wiping.

Figure 8A:
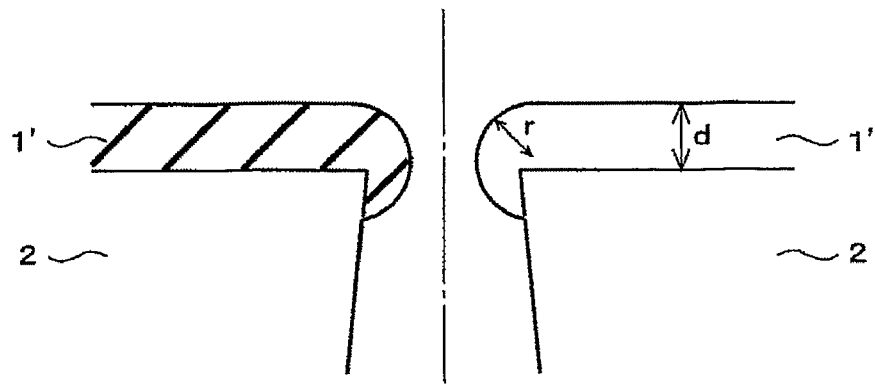
FIG. 8A shows a still another cross-sectional view of an example of a nozzle plate of an inkjet head used in the present invention (first).
Figure 8B:
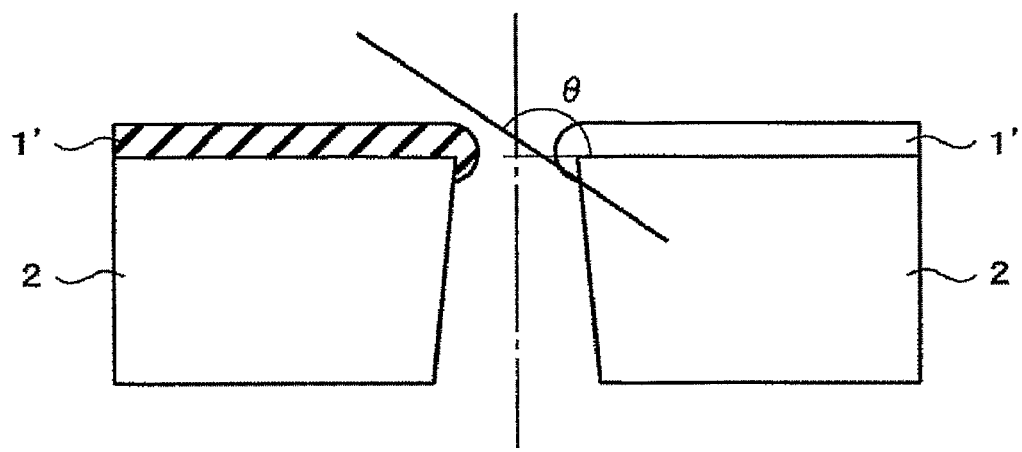
FIG. 8B shows a still another cross-sectional view of an example of a nozzle plate of an inkjet head used in the present invention (second).

With the round shape, no ink residues occur, for the purpose of comparison in the configuration with r<d as shown by an example in FIG. 8A, some edge separation is observed, and in the configuration with θ>90°, as shown in FIG. 8B, discharge of ink droplets is unstable.

Figure 8C:
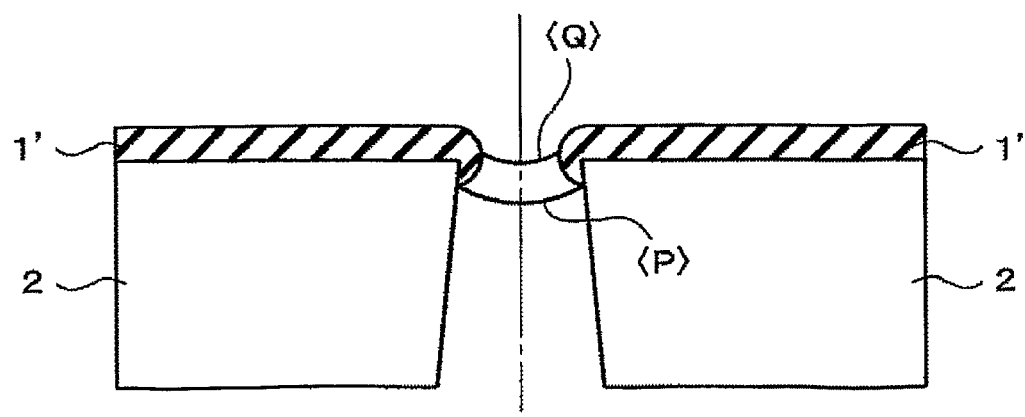
FIG. 8C shows a still another cross-sectional view of an example of a nozzle plate of an inkjet head used in the present invention (third).

Further, when r<d and θ>90°, as shown in FIG. 8C, a meniscus (liquid level) P can be formed in the boundary portion of the ink repellent layer 1 and nozzle plate 2 during ink 3 filling and a meniscus Q can be formed in the convex portion (a portion in which the area of the cross section perpendicular to the central line in the open portion is the smallest) facing the center of the open portion of the ink repellent layer 1'. As a result, ink discharge stability may vary during image formation in the image forming apparatus using the inkjet head including the nozzle plate 2.

(Thickness of Ink Repellent Layer)

Figure 9:
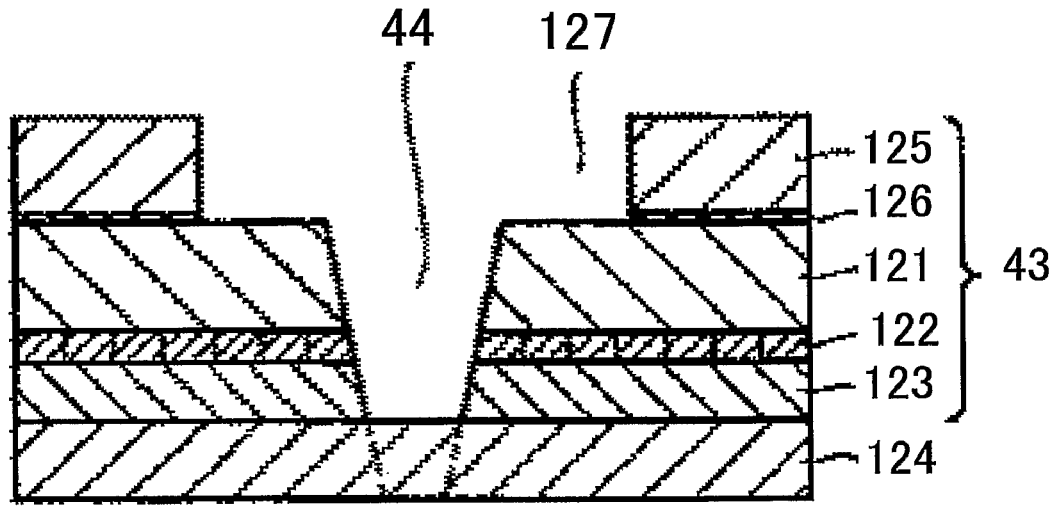
FIG. 9 shows an embodiment of an inkjet head of the present invention.

FIG. 9 shows an example of an inkjet head used in the present invention and shows a state where a nozzle hole is formed by an excimer laser processing. A nozzle plate 43 is obtained by joining a resin member 121 and a high-rigidity member 125 with a thermoplastic adhesive 126. A $SiO_2$ thin-film layer 122 and a fluorine-containing water-repellent layer 123 are successively laminated on the surface of the resin member 121, a nozzle hole 44 of a required diameter is formed in the resin member 121, and a nozzle linking orifice 127 that is linked to the nozzle hole 44 is formed in the high-rigidity member 125. The $SiO_2$ thin-film layer 122 is formed by a method that produces a relatively small amount of heat, that is, at a temperature within a range in which the resin member is not thermally affected. More specifically, the preferred methods include sputtering, ion-beam vapor deposition, ion plating, CVD (chemical vapor deposition), and P-CVD (plasma chemical vapor deposition).

<Material of Ink Repellent Layer>

For material of the ink repellent layer, various materials can be used as long as the material repels water. Examples thereof include fluorine water repellent materials, and silicone water repellent materials.

As the fluorine water repellent materials, various material are known, however, here, necessary water repellency is obtained by depositing a mixture of perfluoropolyoxethane and modified perfluoropolyoxethane (product name: OPTOOL DSX manufactured by Daikin Industries, Ltd.) to be a thickness of 1 Å to 30 Å (0.1 nm to 3 nm). Experimental results reveal that there are no difference in water repellency and wiping endurance for the Optool DSX films having a thickness of 10 Å (1 nm), 20 Å (2 nm), and 30 Å (3 nm). Thus, the thickness of the fluorine water repellent layer is more preferably 1 Å to 20 Å (0.1 nm to 2 nm) in view of cost. A pressure sensitive adhesive tape 124 in which an adhesive material is applied to a resin film is attached to a surface of the fluorine water repellent layer 123 and assists an excimer laser process.

Silicone water repellent materials may be used.

Examples of silicone water repellent materials are as follows:

Liquid silicone resins or elastomers curable at room temperature are known as silicone water-repellent materials, and an ink repellent layer is preferably formed by coating one of them on the base material surface and allowing it to stand in the air at room temperature to induce polymerization for curing.

Liquid silicone resins or elastomers curable by heating are also known as silicone water-repellent materials, and an ink repellent layer is preferably formed by coating one of them on the base material surface and curing by heating.

Liquid silicone resins or elastomers curable by UV radiation are also known as silicone water-repellent materials, and an ink repellent layer is preferably formed by coating one of them on the base material surface and curing by irradiation with UV light.

Figure 10A:
FIG. 10A is a schematic diagram showing a step of forming a nozzle plate in a method for producing an inkjet head used in the present invention (first).
Figure 10B:
FIG. 10B is a schematic diagram showing a step of forming a nozzle plate in a method for producing an inkjet head used in the present invention (second).
Figure 10C:
FIG. 10C is a schematic diagram showing a step of forming a nozzle plate in a method for producing an inkjet head used in the present invention (third).

FIG. 10C shows a step in which a fluorine-containing water repellent agent 123a is coated over a surface of a $SiO_2$ thin-film layer 122. A method employing a spin coater, a roll coater, screen printing, or a spray coater can be used for coating the fluorine-containing water repellent agent, but a method for forming the film by vapor deposition is more effective because it improves adhesivity of the water-repellent film. An even better effect can be obtained with vacuum deposition by performing vacuum deposition in a vacuum chamber directly after forming the $SiO_2$ thin-film layer 122 as shown in FIG. 10B. In the conventional process, the workpiece is removed from the vacuum chamber once the $SiO_2$ thin-film layer 122 has been formed. As a result, impurities or the like adhere to the workpiece surface, thereby degrading adhesion. A variety of materials are known as fluorine-containing water repellent materials. Here, water repellency necessary with respect to the ink can be obtained by using perfluoropolyoxetane, modified perfluoropolyoxetane, or a mixture thereof as a fluorine amorphous compound. The aforementioned Optool DSX, manufactured by Daikin Industries, Ltd. is also called "an alkoxysilane-terminated modified perfluoropolyether."

Figure 10D:
FIG. 10D is a schematic diagram showing a step of forming a nozzle plate in a method for producing an inkjet head used in the present invention (fourth).
Figure 10E:
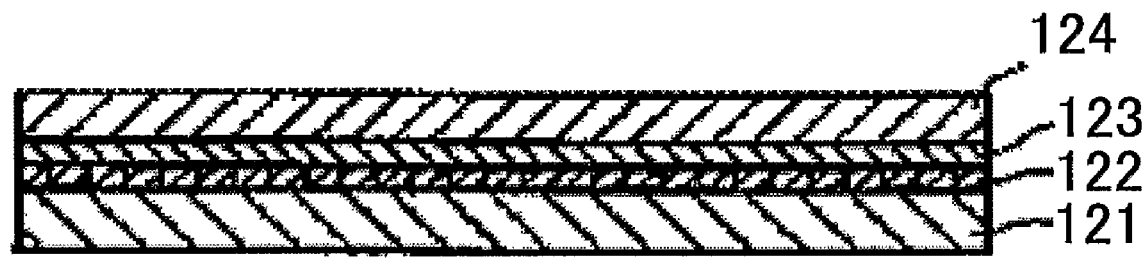
FIG. 10E is a schematic diagram showing a step of forming a nozzle plate in a method for producing an inkjet head used in the present invention (fifth).
Figure 10F:
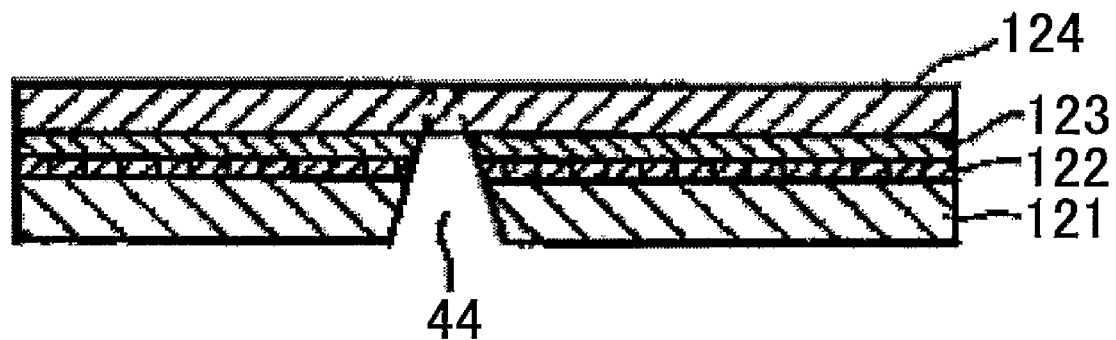
FIG. 10F is a schematic diagram showing a step of forming a nozzle plate in a method for producing an inkjet head used in the present invention (sixth).

FIG. 10D shows a step of allowing the deposited water repellent film to stand in the air. With this process, the fluorine-containing water-repellent agent 123a and the $SiO_2$ thin-film layer 122 are chemically bonded via moisture present in the air and the fluorine-containing water-repellent layer 123 is formed.

(Critical Surface Tension)

The ink repellent layer has a critical surface tension of preferably 5 mN/m to 40 mN/m, and more preferably 5 mN/m to 30 mN/m. When the critical surface tension is more than 30 mN/m, a phenomenon by which the nozzle plate is over-wetted with the ink in long-term use occurs. As a result, curving of ink discharge trajectory or abnormal formation of ink droplets sometimes occurs in repeated printing. On the other hand, when the critical surface tension is more than 40 mN/m, the over-wetting of the nozzle plate occurs from the beginning, whereby curving of ink discharge trajectory or abnormal formation of ink droplets sometimes occurs from the beginning.

The ink repellent material shown in Table 2 is coated on an aluminum board and dried by heating to produce a nozzle plate having an ink repellent layer. Results obtained in measuring the critical surface tension of the ink repellent layer are shown in Table 2.

Here, the critical surface tension can be found by a Zisman method. Thus, a liquid having a known surface tension is dropped on the ink repellent layer, a contact angle θ is measured, and a line descending to the right (Zisman Plot) is obtained by plotting the surface tension of the liquid against the x axis and cos θ against the y axis.

The surface tension at a point where the line is Y=1 (θ=0) can be calculated as the critical surface tension γc. Examples of other methods suitable for finding the critical surface tension include a Fowkes method, an Owens and Wendt method, and a Van Oss method.

Similarly to the above-described method for producing an inkjet head, an inkjet head is produced by using the nozzle plate having an ink repellent layer. The below-described cyan ink of Production Example 5 is sprayed thereonto. The jetting process of the ink is videotaped and observed. For all the nozzle plates used, accurate atomization and excellent discharge stability are confirmed.

TABLE 2

| Manufacturer | Product Name | Critical surface tension | Discharge stability |
|---|---|---|---|
| Dow Corning Toray Co., Ltd. | SR2411 | 21.6 mN/m | Good |
| Shin-Etsu Chemical Co., Ltd. | KBM7803 | 16.9 mN/m | Good |
| Shin-Etsu Chemical Co., Ltd. | KP801M | 6.6 mN/m | Good |

[Ink Record]

An ink record is recorded by means of the inkjet recording method of the present invention. The ink record has an image formed on a recording medium of the ink media set using the ink of the ink media set, according to the present invention.

The ink records have a high image quality with less ink bleed and excel in stability over time, and thus the ink records may be suitably used for various purposes as documents on which various printing and/or images are recorded.

EXAMPLES

Hereinafter, Examples of the present invention will be described, which however shall not be construed as limiting the scope of the present invention. All parts are by mass unless indicated otherwise.

An inkjet head was prepared using a nozzle plate having an ink repellent layer in the same manner as the method for producing an inkjet head set forth above. The cyan ink of Production Example 1 was used in the inkjet head to jet the ink. The process of jetting the ink was videotaped and observed. It was confirmed that the ink droplets were normally formed and the discharge stability was excellent with the use of any of the prepared nozzle plates, respectively.

<Preparation of Pigment Ink>

Production Example 1

Fine Particle Dispersion Containing Cyan Pigment)

—Preparation of Fine Polymer Particle Dispersion Containing Copper Phthalocyanine Pigment—

An inside of a 1 L flask equipped with a mechanical stirrer, a thermometer, a nitrogen gas introducing tube, a reflux tube and a drop funnel was sufficiently replaced with nitrogen gas, then 11.2 g of styrene, 2.8 g of acrylic acid, 12.0 g of lauryl methacrylate, 4.0 g of polyethylene glycol methacrylate, 4.0 g of styrene macromer (product name: AS-6 manufactured by TOAGOSEI CO., LTD.) and 0.4 g of mercaptoethanol were loaded therein, and the temperature was raised to 65° C. Subsequently, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (product name: AS-6 manufactured by TOAGOSEI CO., LTD.), 3.6 g of mercaptoethanol, 2.4 g of azobis dismethylvaleronitrile and 18 g of methyl ethyl ketone was dripped for 2.5 hours in the flask.

After dripping, a mixed solution of 0.8 g of azobis dimethylvaleronitrile and 18 g of methyl ethyl ketone was dripped for 0.5 hours in the flask. After maturing at 65° C. for one hour, 0.8 g of azobis dimethylvaleronitrile was added, and the mixture was further matured for one hour. After the termination of the reaction, 364 g of methyl ethyl ketone was added in the flask to prepare 800 g of a polymer solution having a concentration of 50% by mass. A part of the polymer solution was then dried and measured by gel permeation chromatography (standard: polystyrene, solvent: tetrahydrofuran). The mass-average molecular mass was 15,000.

Then, 28 g of the obtained polymer solution, 26 g of copper phthalocyanine pigment, 13.6 g of an aqueous solution of potassium hydroxide with a concentration of 1 mol/L, 20 g of methyl ethyl ketone, and 30 g of ion-exchanged water were thoroughly stirred. A total of 20 cycles of kneading were then performed using a three-roll mill (product name: NR-84A, manufactured by Noritake Company). The obtained paste was added to 200 g of ion-exchanged water, and the mixture was sufficiently stirred. Thereafter, the mixture was treated with an evaporator so as to evaporate methyl ethyl ketone and water, to thereby obtain 160 g of a blue colored fine polymer particle dispersion having solid content of 20.0% by mass.

The average particle diameter (D50%) of the obtained fine polymer particles which was measured by a particle size distribution measurement device (Microtrack UPA, manufactured by Nikkiso Co. Ltd.) was 93 nm.

Production Example 2

Fine Particle Dispersion Containing Magenta Pigment

—Preparation of Fine Polymer Particle Dispersion Containing Dimethylquinacridone Pigment—

A red purple colored fine polymer particle dispersion was prepared in the same manner as in Production Example 1, except that the copper phthalocyanine pigment in Production Example 1 was replaced with Pigment Red 122.

The average particle diameter (D50%) of the obtained fine polymer particles which was measured by a particle size distribution measurement device (Microtrack UPA, manufactured by Nikkiso Co. Ltd.) was 127 nm.

Production Example 3

Fine Particle Dispersion Containing Yellow Pigment

—Preparation of Fine Polymer Particle Dispersion Containing Monoazo Yellow Pigment—

A yellow colored fine polymer particle dispersion was prepared in the same manner as in Production Example 1, except that the copper phthalocyanine pigment in Production Example 1 was replaced with Pigment Yellow 74.

The average particle diameter (D50%) of the obtained fine polymer particles which was measured by a particle size distribution measurement device (Microtrack UPA, manufactured by Nikkiso Co. Ltd.) was 76 nm.

Production Example 4

Fine Particle Dispersion Containing Black Pigment

—Preparation of Carbon Black Dispersion—

A total of 300 g of commercial acidic carbon black having pH 2.5 (product name: Monarch 1300, manufactured by Cabot Corporation) was mixed thoroughly in 1,000 mL of water. Then, 450 g of sodium hypochlorite (effective chlorine concentration: 12%) was added dropwise and stirred for 8 hours at 100° C. to 105° C. In this liquid, 100 g of sodium hypochlorite (effective chlorine concentration: 12%) was then added, and dispersed for 3 hours in a horizontal disperser. The obtained slurry was diluted tenfold with water, and then pH was adjusted with lithium hydroxide, and the slurry was desalted and concentrated with an ultrafiltration membrane to an electric conductivity of 0.2 mS/cm to obtain a carbon black dispersion liquid having a pigment concentration of 15%. Subsequently, coarse particles were removed by centrifuging, and filtrated through a 1 μm Nylon filter to obtain a carbon black dispersion liquid.

The average particle diameter (D50%) of the obtained fine polymer particles which was measured by a particle size distribution meter (Microtrack UPA, manufactured by Nikkiso Co.) was 95 nm.

Next, ink compositions were prepared by using the fine polymer particle dispersions obtained by Production Examples 1 to 4 and carbon black dispersion liquid.

Production Example 5

—Preparation of Cyan Ink Composition 1—

A total of 20.0 mass % of the fine polymer particle dispersion containing copper phthalocyanine pigment of Production Example 1, 23.0 mass % of 3-methyl-1,3-butanediol, 8.0 mass % of glycerin, 2.0 mass % of 2-ethyl-1,3-hexanediol, 2.5 mass % of FS-300 (manufactured by DuPont), 0.2 mass % of Proxel LV (manufactured by Avecia Co.), 0.5 mass % of 2-amino-2-ethyl-1,3-propanediol, and an appropriate amount of ion-exchanged water were added to obtain 100 mass %. Filtration was performed with a membrane filter having an average pore diameter of 0.8 μm. The solid content was then adjusted to 12 mass % with ion-exchanged water. Thus, an ink composition was prepared. The obtained ink composition had a viscosity of 9 mPa·s and a surface tension of 25 mN/m at a temperature of 25° C. The viscosity was measured at 25° C. with a viscometer (rotary viscometer R500, manufactured by Toki Sangyo Co., Ltd.).

Production Example 6

—Preparation of Magenta Ink Composition 1—

A total of 20.0 mass % of the fine polymer particle dispersion containing dimethylquinacridone pigment of Production Example 2, 22.5 mass % of 3-methyl-1,3-butanediol, 9.0 mass % of glycerin, 2.0 mass % of 2-ethyl-1,3-hexanediol, 2.5 mass % of FS-300 (manufactured by DuPont), 0.2 mass % of Proxel LV (manufactured by Avecia Co.), 0.5 mass % of 2-amino-2-ethyl-1,3-propanediol, and an appropriate amount of ion-exchanged water were added to obtain 100 mass %. Filtration was then performed with a membrane filter having an average pore diameter of 0.8 μm. The solid content was then adjusted to 12 mass % with ion-exchanged water. Thus, an ink composition was prepared. The obtained ink composition had a viscosity of 9 mPa·s and a surface tension of 25 mN/m at a temperature of 25° C.

Production Example 7

—Preparation of Yellow Ink Composition 1—

A total of 20.0 mass % of the fine polymer particle dispersion containing monoazo yellow pigment of Production Example 3, 24.5 mass % of 3-methyl-1,3-butanediol, 8.0 mass % of glycerin, 2.0 mass % of 2-ethyl-1,3-hexanediol, 2.5 mass % of FS-300 (manufactured by DuPont), 0.2 mass % of Proxel LV (manufactured by Avecia Co.), 0.5 mass % of 2-amino-2-ethyl-1,3-propanediol, and an appropriate amount of ion-exchanged water were added to obtain 100 mass %. Filtration was then performed with a membrane filter having an average pore diameter of 0.8 μm. The solid content was then adjusted to 12 mass % with ion-exchanged water. Thus, an ink composition was prepared. The obtained ink composition had a viscosity of 9 mPa·s and a surface tension of 25 mN/m at a temperature of 25° C.

Production Example 8

—Preparation of Black Ink Composition 1—

A total of 20.0 mass % of carbon black dispersion liquid of Production Example 4, 22.5 mass % of 3-methyl-1,3-butanediol, 7.5 mass % of glycerin, 2.0 mass % of 2-pyrrolidone, 2.0 mass % of 2-ethyl-1,3-hexanediol, 2.0 mass % of a compound represented by $R-(OCH_2CH_2)_nOH$ (where R represents an alkyl group having 12 carbon atoms; n=9), 0.2 mass % of Proxel LV (manufactured by Avecia Co.), 0.5 mass % of 2-amino-2-ethyl-1,3-propanediol, and an appropriate amount of ion-exchange water were added to obtain 100 mass %. Filtration was then performed with a membrane filter having an average pore diameter of 0.8 μm. The solid content was then adjusted to 12 mass % with ion-exchanged water. Thus, an ink composition was prepared. The obtained ink composition had a viscosity of 9 mPa·s and a surface tension of 25 mN/m at a temperature of 25° C.

Production Example 9

<Preparation of Dye Ink>

The below-described components were mixed, stirred thoroughly to be dissolved, and pressure filtered through a Floropore filter (product name, manufactured by Sumitomo Electric Industries, Ltd.) having a pore size of 0.45 μm to prepare a dye ink set.
The dye ink composition was as follows:
Dye Ink Composition
Dyes
   Yellow: C.I. Direct Yellow 86
   Cyan: C.I. Direct Blue 199
   Magenta: C.I. Acid Red 285
   Black: C.I. Direct Black 154
Formulation

| Dye | 4 parts |
|---|---|
| Glycerin | 7 parts |
| Thiodiglycol | 7 parts |
| Urea | 7 parts |
| Acetylene glycol | 1.5 parts |
| Water | 73.5 parts |

The obtained ink composition had a viscosity of 4 mPa·s and a surface tension of about 35 dyne/cm at a temperature of 25° C.

Production Example 10

An ink set was produced by preparing inks in the same manner as in Production Examples 5 to 8, except that the solid contents of the inks in Production Examples 5 to 8 were changed to 2.5% by mass.

Production Example 11

An ink set was produced by preparing inks in the same manner as in Production Examples 5 to 8, except that the surfactant FS-300 (manufactured by DuPont) in the inks of Production Examples 5 to 7 and the compound represented by R—(OCH$_2$CH$_2$)$_n$OH (where R represents an alkyl group having 12 carbon atoms; n=9) in the ink of Production Example 8 were respectively changed to KF-643 (manufactured by Shin-Etsu Chemical Co., Ltd.). The ink had a surface tension of 14 dym/cm.

Production Example 12

An ink set was produced by preparing inks in the same manner as in Production Examples 5 to 8, except that the surfactant FS-300 (manufactured by DuPont) in the inks of Production Examples 5 to 7 and the compound represented by R—(OCH$_2$CH$_2$)$_n$OH (where R represents an alkyl group having 12 carbon atoms; n=9) in the ink of Production Example 8 were respectively changed to SPANOL TOC (manufactured by NOF CORPORATION). The ink had a surface tension of 32 dym/cm.

Production Example 13

The pigment dispersion obtained in Production Example 1 was centrifuged at 150,000 rpm by a centrifugal separator (Hitachi CS150GX manufactured by Hitachi Koki Co., Ltd), so that a supernatant had an average particle diameter of 0.008 µm. With the use of the pigment dispersion an ink was prepared in the same manner as in Production Example 5.

Production Example 14

The pigment dispersion obtained in Production Example 1 was centrifuged at 30,000 rpm by a centrifugal separator U-1-L (manufactured by KANSAI CENTRIFUGAL SEPARATOR M.F.G. CO., LTD.), so that precipitation particles had an average particle diameter of 0.17 µm. With the use of the pigment dispersion an ink was prepared in the same manner as in Production Example 5.

<Production of Base Paper>

Production Example 15

—Preparation of Support 1—

| | |
|---|---|
| LBKP | 80 parts |
| NBKP | 20 parts |
| Light calcium carbonate (product name: TP-121, manufactured by Okutama Kogyo Kabushiki Kaisha) | 10 parts |
| Aluminum sulfate | 1.0 part |
| Amphoteric starch (product name: Cato 3210, manufactured by Japan NSC Co., Ltd.) | 1.0 part |
| Neutral rosin sizing agent (product name: NeuSize M-10, manufactured by Harima Kasei Kabushiki Kaisha) | 0.3 parts |
| Yield improving agent (product name: NR-11LS, manufactured by HYMO Co., Ltd.) | 0.02 parts |

The 0.3 mass % of slurry of the above-described mixture was processed in a fourdrinier former and finished by machine calender so as to prepare a support 1 having a basis weight of 79 g/m$^2$. In the size pressing step of the papermaking process, an aqueous solution of oxidized starch was applied such that the adhered solid content was 1.0 g/m$^2$ for one surface.

Example 1

A coating solution was prepared by adding water to the following formulation so as to have a solid content concentration of 60%.

| | |
|---|---|
| Heavy calcium carbonate having a particle diameter of 0.7 µm (FMT-90 manufactured by FIMATEC LTD.) | 60 parts |
| Light calcium carbonate having a particle diameter of 3.4 µm (TP-121 manufactured by OKUTAMA KOGYO CO., LTD.) | 30 parts |
| Kaolin having a particle diameter of 1.2 µm (Nusurf manufactured by Engelhard) | 10 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.) | 0.5 parts |

This coating solution was applied on both surfaces of the base paper with an air knife coater so as to have a thickness of 10 µm for one surface, and dried by hot-air thereby obtaining a recording medium 1 of the present invention.

An ink set 1 of black, yellow, magenta and cyan consisting of the ink compositions prepared in the Production Examples 5 to 8 was prepared. Images were printed on the recording medium 1 with the ink set 1 at an image resolution of 600 dpi using a 300 dpi drop-on-demand printer prototype having nozzles with a nozzle resolution of 384. The large ink drop size was 20 pL, medium ink drop size was 10 pl, and small ink drop size was 2 pL. The total amount of ink for a secondary color was limited to 140%. Solid images and characters were printed so that a total amount of ink for 300 dots square did not exceed 15 g/m$^2$ at the time of printing the solid images. A printing pattern for evaluation was produced using Word2000 (9.0.6926 SP-3) manufactured by Microsoft Corporation.

Images for evaluating gloss and beading was prepared by drawing seven 5 cm squares (for seven colors) adjacent to each other using a graphic drawing tool of Word2000 with setting line and fill by each color of Y, M, C, K, R, G and B in the user setting.

The conditions of fill and line were as follows:

Yellow (Red 0 Green 255 Blue 255);

Cyan (Red 255 Green 255 Blue 0);

Magenta (Red 255 Green 0 Blue 255);

Red (Red 255 Green 0 Blue 0);

Green (Red 0 Green 255 Blue 0);

Blue (Red 0 Green 0 Blue 255); and

Black (Red 0 Green 0 Blue 0).

Example 2

Printing was performed in the same manner as in Example 1, except that the heavy calcium carbonate in Example 1 (Recording Medium 1) was changed to the following one (Recording Medium 2).

Heavy calcium carbonate having a particle diameter of 1.2 µm (HYDROCARB-60 manufactured by BIHOKU FUNKA KOGYO CO., LTD.) 60 parts Example 3

Printing was performed in the same manner as in Example 1, except that the heavy calcium carbonate in Example 1 (Recording Medium 1) was changed to the following one (Recording Medium 3).

Heavy calcium carbonate having a particle diameter of 4.2 µm (SOFTON1200 manufactured by BIHOKU FUNKA KOGYO CO., LTD.) 60 parts

Example 4

Printing was performed in the same manner as in Example 1, except that the medium in Example 1 was changed to OK Astro Dull (manufactured by Oji paper Co., Ltd.).

Example 5

Printing was performed in the same manner as in Example 1, except that the medium in Example 1 was changed to OK Trinity NaVi (manufactured by Oji paper Co., Ltd.).

Example 6

Printing was performed in the same manner as in Example 1, except that the medium in Example 1 was changed to OK Neo Topkote Mat (manufactured by Oji paper Co., Ltd.).

Example 7

Printing was performed in the same manner as in Example 1, except that the medium in Example 1 was changed to Shiorai matte (manufactured by Nippon Paper Industries Co., Ltd.).

Example 8

Printing was performed in the same manner as in Example 1, except that the medium in Example 1 was changed to OK Astro mat (manufactured by Oji paper Co., Ltd.).

Example 9

Printing was performed in the same manner as in Example 1, except that the medium in Example 1 was changed to Utrillo Excel (manufactured by Nippon Paper Industries Co., Ltd.).

Example 10

Printing was performed in the same manner as in Example 1, except that the medium in Example 1 was changed to OK Topkote Mat N (manufactured by Oji paper Co., Ltd.).

Example 11

Printing was performed in the same manner as in Example 1, except that the medium in Example 1 was changed to OK Kasao (manufactured by Oji paper Co., Ltd.).

Example 12

Printing was performed in the same manner as in Example 1, except that the medium in Example 1 was changed to Kanto Excel (manufactured by Daio Paper Corporation).

Example 13

Printing was performed in the same manner as in Example 1, except that the medium in Example 1 was changed to OK RoyalKote (manufactured by Oji paper Co., Ltd.).

Example 14

Printing was performed in the same manner as in Example 1, except that the medium in Example 1 was changed to Easter DX (manufactured by Nippon Paper Industries Co., Ltd.).

Example 15

Printing was performed in the same manner as in Example 1, except that the medium in Example 5 (OK Trinity NaVi) was subjected to calender treatment at a linear pressure of 10 kg/m so as to adjust a white paper gloss at 13.

Comparative Example 1

Printing was performed in the same manner as in Example 1, except that the formulation of the coating solution was changed as follows (Recording Medium 5):

| | |
|---|---|
| Heavy calcium carbonate having a particle diameter of 8.7 μm (WHITON BF-100 manufactured by BIHOKU FUNKA KOGYO CO., LTD.) | 60 parts |
| Light calcium carbonate having a particle diameter of 3.4 μm (TP-121 manufactured by OKUTAMA KOGYO CO., LTD.) | 30 parts |
| Kaolin having a particle diameter of 1.2 μm (Nusurf manufactured by Engelhard) | 10 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.). | 0.5 parts |

Comparative Example 2

Printing was performed in the same manner as in Example 1, except that the medium in Example 1 was changed to a Super Fine Paper (manufactured by SEIKO EPSON CORPORATION).

Comparative Example 3

Printing was performed in the same manner as in Example 1, except that the medium in Example 1 was changed to POD Gloss Coat (manufactured by Oji paper Co., Ltd.).

Comparative Example 4

Printing was performed in the same manner as in Example 1, except that the medium in Example 1 was changed to Mirrorkote platinum (manufactured by Oji paper Co., Ltd.).

Comparative Example 5

Printing was performed in the same manner as in Example 1, except that the medium in Example 1 was changed to Crispia (manufactured by SEIKO EPSON CORPORATION).

Comparative Example 6

Printing was performed in the same manner as in Example 1, except that the medium in Example 1 was changed to OK Topkote Mat N (manufactured by Oji paper Co., Ltd.), and the dye ink of Production Example 9 was used.

Comparative Example 7

Printing was performed in the same manner as in Example 1, except that the medium in Example 1 was changed to OK TOPKOTE Mat N (manufactured by Oji paper Co., Ltd.), and the pigment ink of Production Example 10 was used.

Comparative Example 8

Printing was performed in the same manner as in Example 1, except that the medium of Example 5 (OK Trinity NaVi) was subjected to calender treatment at a linear pressure of 15 kg/m so as to adjust the value of a surface roughness Ra.

Comparative Example 9

Printing was performed in the same manner as in Example 1, except that the medium was produced without containing the SBR latex (L-2082 manufactured by Asahi Kasei Chemicals Corporation) (Recording medium 4).

Comparative Example 10

Printing was performed in the same manner as in Example 1, except that the ink of Production Example 11 was used.

Comparative Example 11

Printing was performed in the same manner as in Example 1, except that the ink of Production Example 12 was used.

Comparative Example 12

Printing was performed in the same manner as in Example 1, except that the ink of Production Example 13 was used.

Comparative Example 13

Printing was performed in the same manner as in Example 1, except that the ink of Production Example 14 was used.
Evaluation Criteria and Measurement Method
<Ink Discharge Ability>

A test printing was performed on a plain paper, and ink discharge ability was evaluated on the basis of the following criteria.
A: Printing was normally performed.
B: Abnormal image was observed due to ink spraying trajectory or non discharge of ink.
<Image Density>

Image Density was measured by Color Reflection Densitometer (manufactured by X-Rite), and evaluated on the basis of the following criteria.

A: The image density of a solid part in each color was 1.0 or more, and suitable density could be obtained.
B: The image density of a solid part in each color was less than 1.0.
<Glossiness>

Figure 13:
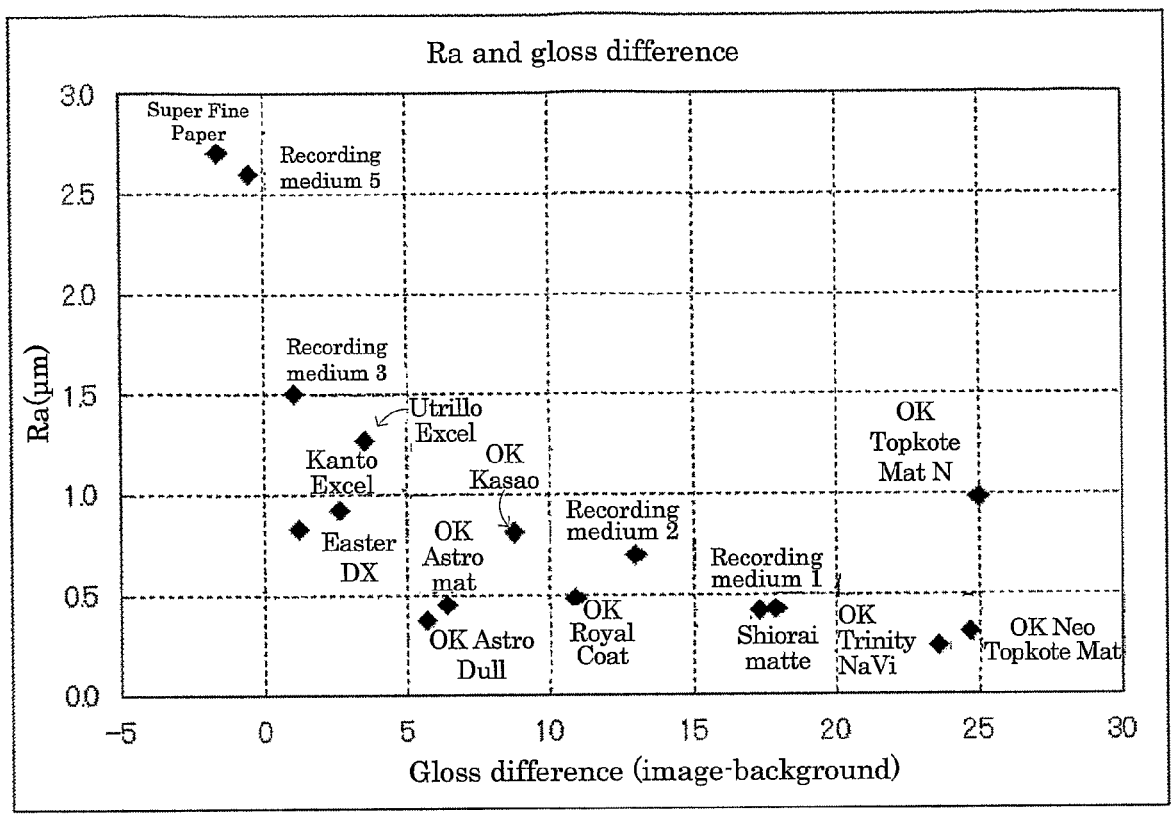
FIG. 13 is a graph showing a difference between an image gloss and a background gloss.

The background gloss at an angle of 60 degrees and the gloss of yellow solid chart at an angle of 60 degrees were measured using a micro-gloss Glossimeter (manufactured by BYK-Gardner). The difference between the image gloss and background gloss was evaluated and the results are shown in FIG. 13.
<Background Matte Texture>

A background matte texture was visually observed under fluorescent light, and evaluated on the basis of the following criteria.
A: The background gloss was less than 10, and glare was not observed.
B: The background gloss was 10 to 13, and glare was not observed.
C: The background gloss was more than 13, or glare was observed.
<(Secondary Color) Beading>

Figure 11:
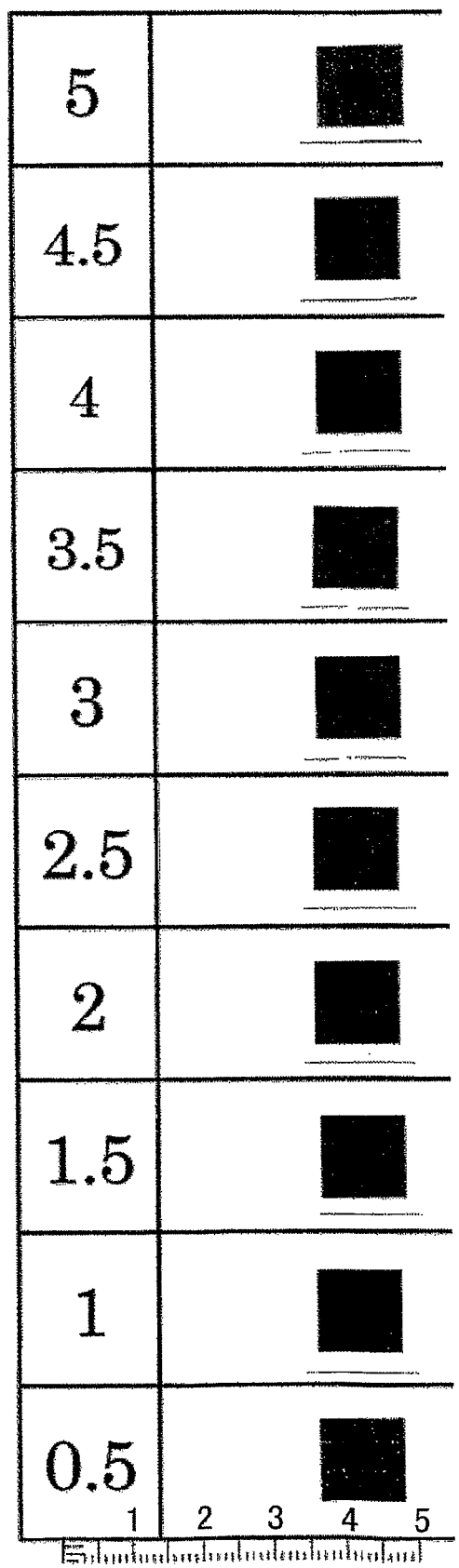
FIG. 11 shows a sample for rank of an uneven density in a solid part.

The degree of uneven density in the solid part was visually observed, and evaluated on the basis of the following criteria using a sample for rank in FIG. 11.
A: The level of unevenness was 3.5 or more.
B: The level of unevenness was 2 or more to less than 3.5.
C: The level of unevenness was less than 2.
<Printability>

By using a RI (Rotay Ink) printability tester (manufactured by IHI Machinery and Furnace Co., Ltd.), a solid image was formed with 0.8 cc of a cyan ink, HIGH UNITY NEO SOY (manufactured by TOYO INK MFG. CO., LTD.) on a coated paper, and left to stand for 8 hours at 23° C. and RH65%. Next, A2 grade glossy coated paper, OK Topkote+104.7 gsm (manufactured by Oji paper Co., Ltd.) was placed on the printed solid image in a size of 5 cm×5 cm, and subjected to calender treatment at a linear pressure of 5 kg/m so as to observe the amount of a transferred ink. The density of the ink transferred part was measured and evaluated on the basis of the following criteria.
A: The density was less than 0.05.
B: The density was 0.05 or more to less than 0.10.
C: The density was 0.10 or more.

TABLE 3-1

| | Medium | Manufacturer | Ink | Ink discharge ability | Image density | Gloss at 60 degrees | | | Centerline average roughness Ra at a cut-off value of 0.8 μm | Background matte texture | (Secondary color) Beading | Offset printability |
|---|---|---|---|---|---|---|---|---|---|---|---|---|
| | | | | | | Background | Image | Difference | | | | |
| Ex. 1 | Recording medium 1 | — | Pigment | A | A | 4 | 21.9 | 17.9 | 0.43 | A | A | A |
| Ex. 2 | Recording medium 2 | — | Pigment | A | A | 5 | 18 | 13 | 0.70 | A | A | A |
| Ex. 3 | Recording medium 3 | — | Pigment | A | A | 4 | 5 | 1 | 1.50 | A | A | A |
| Ex. 4 | OK Astro Dull | Oji paper Co., Ltd. | Pigment | A | A | 12.1 | 17.8 | 5.7 | 0.37 | B | A | A |
| Ex. 5 | OK Trinity NaVi | Oji paper Co., Ltd. | Pigment | A | A | 10.6 | 34.2 | 23.6 | 0.24 | B | A | A |
| Ex. 6 | OK Neo Topkote Mat | Oji paper Co., Ltd. | Pigment | A | A | 7.5 | 32.2 | 24.7 | 0.31 | A | A | A |
| Ex. 7 | Shiorai matte | Nippon Paper Industries Co., Ltd. | Pigment | A | A | 6.6 | 23.9 | 17.3 | 0.42 | A | A | A |

TABLE 3-1-continued

| | Medium | Manufacturer | Ink | Ink dischargeability | Image density | Gloss at 60 degrees Background | Gloss at 60 degrees Image | Gloss at 60 degrees Difference | Centerline average roughness Ra at a cut-off value of 0.8 μm | Background matte texture | (Secondary color) Beading | Offset printability |
|---|---|---|---|---|---|---|---|---|---|---|---|---|
| Ex. 8 | OK Astro mat | Oji paper Co., Ltd. | Pigment | A | A | 6.3 | 12.7 | 6.4 | 0.45 | A | A | A |
| Ex. 9 | Utrillo Excel | Nippon Paper Industries Co., Ltd. | Pigment | A | A | 6.1 | 9.6 | 3.5 | 1.27 | A | A | A |
| Ex. 10 | OK Topkote Mat N | Oji paper Co., Ltd. | Pigment | A | A | 5.5 | 30.5 | 25 | 0.98 | A | A | A |
| Ex. 11 | OK Kasao | Oji paper Co., Ltd. | Pigment | A | A | 5.4 | 14.2 | 8.8 | 0.81 | A | A | A |
| Ex. 12 | Kanto Excel | Daio Paper Corporation | Pigment | A | A | 5.2 | 7.8 | 2.6 | 0.92 | A | A | A |
| Ex. 13 | OK RoyalKote | Oji paper Co., Ltd. | Pigment | A | A | 4.4 | 15.3 | 10.9 | 0.48 | A | A | A |
| Ex. 14 | Easter DX | Nippon Paper Industries Co., Ltd. | Pigment | A | A | 3.6 | 4.8 | 1.2 | 0.83 | A | A | A |
| Ex. 15 | OK Trinity NaVi(calender treatment) | Oji paper Co., Ltd. | Pigment | A | A | 13 | 35 | 22 | 0.20 | B | A | A |

TABLE 3-2

| | Medium | Manufacturer | Ink | Ink dischargeability | Image density | Gloss at 60 degrees Background | Gloss at 60 degrees Image | Gloss at 60 degrees Difference | Centerline average roughness Ra at a cut-off value of 0.8 μm | Background matte texture | (Secondary color) Beading | Offset printability |
|---|---|---|---|---|---|---|---|---|---|---|---|---|
| Comp. Ex. 1 | Recording medium 5 | — | Pigment | A | A | 3 | 2.5 | −0.5 | 2.60 | A | A | A |
| Comp. Ex. 2 | Super Fine Paper | SEIKO EPSON CORPORATION | Pigment | A | A | 2.5 | 0.9 | −1.6 | 2.71 | A | A | C |
| Comp. Ex. 3 | POD GLOSS COAT | Oji paper Co., Ltd. | Pigment | A | A | 20 | 40 | 20 | 0.76 | C | A | A |
| Comp. Ex. 4 | Mirrorkote platinum | Oji paper Co., Ltd. | Pigment | A | A | 75 | 65 | −10 | 0.10 | C | A | A |
| Comp. Ex. 5 | Crispia | SEIKO EPSON CORPORATION | Pigment | A | A | 65 | 55 | −10 | 0.03 | C | A | C |
| Comp. Ex. 6 | OK Topkote Mat N | Oji paper Co., Ltd. | Dye | A | B | 5.5 | 5.5 | 0 | 0.98 | A | C | A |
| Comp. Ex. 7 | OK Topkote Mat N | Oji paper Co., Ltd. | Pigment (2%) | A | B | 5.5 | 20 | 14.5 | 0.98 | A | C | A |
| Comp. Ex. 8 | OK Trinity NaVI (calender treatment) | Oji paper Co., Ltd. | Pigment | A | A | 15 | 35 | 20 | 0.19 | C | C | A |
| Comp. Ex. 9 | Recording medium 4 | — | — | — | — | — | — | — | — | — | — | C: Paper peeled off |
| Comp. Ex. 10 | Recording medium 1 | — | Pigment (14 dyn) Pro. Ex. 11 | B (not discharged) | A | 4 | — | — | 0.43 | A | — | A |
| Comp. Ex. 11 | Recording medium 1 | — | Pigment (32 dyn) Pro. Ex. 12 | A | B | 4 | 21 | 17 | 0.43 | A | C | A |
| Comp. Ex. 12 | Recording medium 1 | — | Pigment (0.008 μm) Pro. Ex. 13 | A | B | 4 | 23 | 19 | 0.43 | A | A | A |
| Comp. Ex. 13 | Recording medium 1 | — | Pigment (0.16 μm) Pro. Ex. 14 | B (not discharged) | A | 4 | — | — | 0.43 | A | — | A |

Pro. Ex.: Production Example

TABLE 4-1

| | Gloss at 60 degrees | | | Centerline average roughness Ra at a cut-off value of 0.8 µm | Cationic additive content | Gloss (background) | Thickness (Coat layer, one surface µm) | Binder component | | Filler (parts by mass) | | |
|---|---|---|---|---|---|---|---|---|---|---|---|---|
| | Background | Image | Difference | | | | | Starch or cationized starch | SBR | CaCO₃ (heavy) | CaCO₃ (light) | Other fillers |
| Ex. 1 | 4 | 21.9 | 17.9 | 0.43 | 0 | 4 | 10 µm | present | present | 60 (0.7 µm) | 30 (3.4 µm) | 10 |
| Ex. 2 | 5 | 18 | 13 | 0.70 | 0 | 5 | 10 µm | present | present | 60 (1.2 µm) | 30 (3.4 µm) | 10 |
| Ex. 3 | 4 | 5 | 1 | 1.50 | 0 | 4 | 10 µm | present | present | 60 (4.2 µm) | 30 (3.4 µm) | 10 |
| Ex. 4 | 12.1 | 17.8 | 5.7 | 0.37 | 0 | 12.1 | 8 µm or more | present | present | | | |
| Ex. 5 | 10.6 | 34.2 | 23.6 | 0.24 | 0 | 10.6 | 8 µm or more | present | present | | | |
| Ex. 6 | 7.5 | 32.2 | 24.7 | 0.31 | 0 | 7.5 | 8 µm or more | present | present | | | |
| Ex. 7 | 6.6 | 23.9 | 17.3 | 0.42 | 0 | 6.6 | 8 µm or more | present | present | | | |
| Ex. 8 | 6.3 | 12.7 | 6.4 | 0.45 | 0 | 6.3 | 8 µm or more | present | present | | | |
| Ex. 9 | 6.1 | 9.6 | 3.5 | 1.27 | 0 | 6.1 | 5 µm or more | present | present | | | |
| Ex. 10 | 5.5 | 30.5 | 25 | 0.98 | 0 | 5.5 | 8 µm or more | present | present | | | |
| Ex. 11 | 5.4 | 14.2 | 8.8 | 0.81 | 0 | 5.4 | 8 µm or more | present | present | | | |
| Ex. 12 | 5.2 | 7.8 | 2.6 | 0.92 | 0 | 5.2 | 2 µm or more | present | present | | | |
| Ex. 13 | 4.4 | 15.3 | 10.9 | 0.48 | 0 | 4.4 | 8 µm or more | present | present | | | |
| Ex. 14 | 3.6 | 4.8 | 1.2 | 0.83 | 0 | 3.6 | 5 µm or more | present | present | | | |
| Ex. 15 | 13 | 35 | 22 | 0.20 | 0 | 13 | 8 µm or more | present | present | | | |

TABLE 4-2

| | Gloss at 60 degrees | | | Centerline average roughness Ra at a cut-off value of 0.8 µm | Cationic additive content | Gloss (background) | Thickness (Coat layer, one surface µm) | Binder component | | Filler (parts by mass) | | |
|---|---|---|---|---|---|---|---|---|---|---|---|---|
| | Background | Image | Difference | | | | | Starch or cationized starch | SBR | CaCO₃ (heavy) | CaCO₃ (light) | Other fillers |
| Comp. Ex. 1 | 3 | 2.5 | −0.5 | 2.60 | 0 | 3 | 10 µm | present | present | 60 (8.7 µm) | 30 (3.4 µm) | 10 |
| Comp. Ex. 2 | 2.5 | 0.9 | −1.6 | 2.71 | 0.2% or more | 2.5 | 5 µm or more | absent | absent | | | |
| Comp. Ex. 3 | 20 | 40 | 20 | 0.76 | 0 | 20 | 8 µm or more | present | present | | | |
| Comp. Ex. 4 | 75 | 65 | −10 | 0.10 | 0 | 75 | 8 µm or more | present | present | | | |
| Comp. Ex. 5 | 65 | 55 | −10 | 0.03 | 0.2% or more | 65 | 15 µm or more | absent | absent | | | |
| Comp. Ex. 6 | 5.5 | 5.5 | 0 | 0.98 | 0 | 5.5 | 8 µm or more | present | present | | | |
| Comp. Ex. 7 | 5.5 | 20 | 14.5 | 0.98 | 0 | 5.5 | 8 µm or more | present | present | | | |
| Comp. Ex. 8 | 15 | 35 | 20 | 0.19 | 0 | 15 | 8 µm or more | present | present | | | |
| Comp. Ex. 9 | — | — | — | — | 0 | — | 10 µm | present | absent | 60 (0.7 µm) | 30 (3.4 µm) | 10 |
| Comp. Ex. 10 | 4 | — | — | 0.43 | 0 | 4 | 10 µm | present | present | 60 (0.7 µm) | 30 (3.4 µm) | 10 |
| Comp. Ex. 11 | 4 | 21 | 17 | 0.43 | 0 | 4 | 10 µm | present | present | 60 (0.7 µm) | 30 (3.4 µm) | 10 |
| Comp. Ex. 12 | 4 | 23 | 19 | 0.43 | 0 | 4 | 10 µm | present | present | 60 (0.7 µm) | 30 (3.4 µm) | 10 |
| Comp. Ex. 13 | 4 | — | — | 0.43 | 0 | 4 | 10 µm | present | present | 60 (0.7 µm) | 30 (3.4 µm) | 10 |

TABLE 5

| | Yellow (Y) | | | Magenta (M) | | | Cyan (Cy) | | | Black (Bk) | | |
|---|---|---|---|---|---|---|---|---|---|---|---|---|
| | No. | C | σ | No. | C | σ | No. | C | σ | No. | C | σ |
| Ex. 1 | 7 | 12 | 25 | 6 | 12 | 25 | 5 | 12 | 25 | 8 | 12 | 25 |
| Ex. 2 | 7 | 12 | 25 | 6 | 12 | 25 | 5 | 12 | 25 | 8 | 12 | 25 |
| Ex. 3 | 7 | 12 | 25 | 6 | 12 | 25 | 5 | 12 | 25 | 8 | 12 | 25 |
| Ex. 4 | 7 | 12 | 25 | 6 | 12 | 25 | 5 | 12 | 25 | 8 | 12 | 25 |
| Ex. 5 | 7 | 12 | 25 | 6 | 12 | 25 | 5 | 12 | 25 | 8 | 12 | 25 |
| Ex. 6 | 7 | 12 | 25 | 6 | 12 | 25 | 5 | 12 | 25 | 8 | 12 | 25 |
| Ex. 7 | 7 | 12 | 25 | 6 | 12 | 25 | 5 | 12 | 25 | 8 | 12 | 25 |
| Ex. 8 | 7 | 12 | 25 | 6 | 12 | 25 | 5 | 12 | 25 | 8 | 12 | 25 |
| Ex. 9 | 7 | 12 | 25 | 6 | 12 | 25 | 5 | 12 | 25 | 8 | 12 | 25 |
| Ex. 10 | 7 | 12 | 25 | 6 | 12 | 25 | 5 | 12 | 25 | 8 | 12 | 25 |
| Ex. 11 | 7 | 12 | 25 | 6 | 12 | 25 | 5 | 12 | 25 | 8 | 12 | 25 |
| Ex. 12 | 7 | 12 | 25 | 6 | 12 | 25 | 5 | 12 | 25 | 8 | 12 | 25 |
| Ex. 13 | 7 | 12 | 25 | 6 | 12 | 25 | 5 | 12 | 25 | 8 | 12 | 25 |
| Ex. 14 | 7 | 12 | 25 | 6 | 12 | 25 | 5 | 12 | 25 | 8 | 12 | 25 |
| Ex. 15 | 7 | 12 | 25 | 6 | 12 | 25 | 5 | 12 | 25 | 8 | 12 | 25 |
| Comp. Ex. 1 | 7 | 12 | 25 | 6 | 12 | 25 | 5 | 12 | 25 | 8 | 12 | 25 |
| Comp. Ex. 2 | 7 | 12 | 25 | 6 | 12 | 25 | 5 | 12 | 25 | 8 | 12 | 25 |
| Comp. Ex. 3 | 7 | 12 | 25 | 6 | 12 | 25 | 5 | 12 | 25 | 8 | 12 | 25 |
| Comp. Ex. 4 | 7 | 12 | 25 | 6 | 12 | 25 | 5 | 12 | 25 | 8 | 12 | 25 |
| Comp. Ex. 5 | 7 | 12 | 25 | 6 | 12 | 25 | 5 | 12 | 25 | 8 | 12 | 25 |
| Comp. Ex. 6 | 9 | 11 | 35 | 9 | 11 | 35 | 9 | 11 | 35 | 9 | 11 | 35 |
| Comp. Ex. 7 | 10 | 2.5 | 25 | 10 | 2.5 | 25 | 10 | 2.5 | 25 | 10 | 2.5 | 25 |
| Comp. Ex. 8 | 7 | 12 | 25 | 6 | 12 | 25 | 5 | 12 | 25 | 8 | 12 | 25 |
| Comp. Ex. 9 | 7 | 12 | 25 | 6 | 12 | 25 | 5 | 12 | 25 | 8 | 12 | 25 |
| Comp. Ex. 10 | 11 | 12 | 14 | 11 | 12 | 14 | 11 | 12 | 14 | 11 | 12 | 14 |
| Comp. Ex. 11 | 12 | 12 | 32 | 12 | 12 | 32 | 12 | 12 | 32 | 12 | 12 | 32 |
| Comp. Ex. 12 | 13 | 12 | 25 | 13 | 12 | 25 | 13 | 12 | 25 | 13 | 12 | 25 |
| Comp. Ex. 13 | 14 | 12 | 25 | 14 | 12 | 25 | 14 | 12 | 25 | 14 | 12 | 25 |

No. = Produciton Example Number, C = Solid Content (%), σ = Surface Tension(mN/m)
Note:
In the formulation of the dye ink of Production Example 9, urea was included in the solid content.

The surfactants in the inks of Production Examples 11 and 12 differed from those in the inks of Production Examples 5 to 8.

Industrial Applicability

According to the recording method of the present invention, so-called an inkjet recording image having image gloss can be provided at a high speed by using a recording medium having matte or dull texture close to that of general commercial printing, or a commercial printing medium itself, and the recording method of the present invention can be advantageously applied to an ink record, inkjet recording apparatus, and inkjet recording method. Further, the obtained print is excellent in resistance of images to rubbing and handling ability immediately after printing.

The inkjet recording method of the present invention are applicable to various types of recording by an inkjet recording system, and in particular advantageously applicable, for example, to printers, facsimile devices, copiers, and printer/fax/copier multipurpose machines for inkjet recording.

The invention claimed is:
1. An inkjet recording method comprising:
printing an image on a recording medium using an aqueous ink,
wherein the recording medium comprises:
a support comprising a cellulose pulp; and
a coat layer containing a pigment and a binder, and optionally containing a cationic additive in an amount of 0.1% or less in the total amount of the coat layer, the coat layer formed in a form of one or more layers on at least one surface of the support,
wherein the recording medium has an outermost layer of the coat layer having a gloss at an angle of 60 degrees in accordance with JIS-ZS-8741 of 13 or less, and a centerline average roughness Ra of 0.2μm to 0.7μm at a cut-off value of 0.8μm, and
wherein the aqueous ink comprises:
coloring particles;
a resin emulsion;
water; and
a wetting agent;
wherein the aqueous ink has a solid content of 3% by mass or more.

2. The inkjet recording method according to claim 1, wherein the recording medium comprises SBR latex and any one of starch and cationized starch as the binder and calcium carbonate as an inorganic pigment in the coat layer.

3. The inkjet recording method according to claim 1, wherein the aqueous ink comprises the coloring particles, glycerin, a water soluble organic solvent, the water, a surfactant, and the resin emulsion, wherein the aqueous ink has a surface tension of 15 mN/m to 30 mN/m.

4. The inkjet recording method according to claim 1, wherein the aqueous ink comprises a dispersible colorant having an average particle diameter of 0.01 µm to 0.16 µm as a colorant.

5. The inkjet recording method according to claim 1, comprising jetting the aqueous ink from an inkjetting unit so as to form an image on the recording medium by applying a stimulus.

6. The inkjet recording method according to claim 5, wherein the stimulus is at least one selected from the group consisting of heat, pressure, vibration and light.

7. The inkjet recording method according to claim 1, wherein the aqueous ink is adhered on the recording medium in a maximum amount of 20 g/m$^2$.

8. A recording medium for offset printing and inkjet printing comprising:
   a support comprising a cellulose pulp; and
   a coat layer containing a pigment and a binder, and optionally containing a cationic additive in an amount of 0.1% or less in the total amount of the coat layer, the coat layer formed in a form of one or more layers on at least one surface of the support,
   wherein the recording medium has an outermost layer of the coat layer having a gloss at an angle of 60 degrees in accordance with JIS-ZS-8741 of 13 or less, and a centerline average roughness Ra of 0.2 µm to 0.7 µm at a cut-off value of 0.8 µm, and comprises SBR latex and any one of starch and cationized starch as the binder and calcium carbonate as an inorganic pigment in the coat layer.

* * * * *